(12) United States Patent  
Shimizu

(10) Patent No.: US 9,003,449 B2  
(45) Date of Patent: Apr. 7, 2015

(54) PLAYBACK DEVICE, TELEVISION RECEPTION DEVICE USING THE SAME, PLAYBACK METHOD, AND COMPUTER PROGRAM

(75) Inventor: Toshinori Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/002,149

(22) PCT Filed: Feb. 28, 2012

(86) PCT No.: PCT/JP2012/054879  
§ 371 (c)(1),  
(2), (4) Date: Aug. 29, 2013

(87) PCT Pub. No.: WO2012/118059  
PCT Pub. Date: Sep. 7, 2012

(65) Prior Publication Data  
US 2013/0340019 A1    Dec. 19, 2013

(30) Foreign Application Priority Data  
Mar. 1, 2011    (JP) .................................. 2011-044021

(51) Int. Cl.  
*H04N 5/445* (2011.01)  
*H04N 21/485* (2011.01)  
*H04N 21/433* (2011.01)  
*H04N 5/44* (2011.01)

(52) U.S. Cl.  
CPC ......... *H04N 21/485* (2013.01); *H04N 21/4334* (2013.01); *H04N 5/4403* (2013.01)

(58) Field of Classification Search  
CPC .................................................. H04N 21/4332

USPC .......................................................... 725/50  
See application file for complete search history.

(56) References Cited

U.S. PATENT DOCUMENTS

| | | | |
|---|---|---|---|
| 6,999,129 B2 | 2/2006 | Shirahama et al. | |
| 8,694,533 B2 * | 4/2014 | Oztaskent et al. ............ | 707/769 |
| 2002/0157094 A1 * | 10/2002 | Saito et al. ..................... | 725/38 |
| 2005/0120371 A1 | 6/2005 | Kimura et al. | |
| 2008/0172617 A1 | 7/2008 | Takeda et al. | |

FOREIGN PATENT DOCUMENTS

| | | |
|---|---|---|
| JP | 2001-275056 A | 10/2001 |
| JP | 2001-326876 A | 11/2001 |
| JP | 2002-158941 A | 5/2002 |
| JP | 2004-072502 A | 3/2004 |

(Continued)

OTHER PUBLICATIONS

International Search Report issued in PCT/JP2012/054879, mailed on Mar. 27, 2012.  
Notice of Allowance issued in Japanese Patent Application No. 2011-044021 dated Apr. 16, 2013.

(Continued)

*Primary Examiner* — Dominic D Saltarelli  
(74) *Attorney, Agent, or Firm* — Birch, Stewart, Kolasch & Birch, LLP

(57) ABSTRACT

A playback device for playing back a program, including a program information acquisition unit configured to acquire program identification information for identifying a program; and a memory unit configured to store an adjustment item setting file for setting an adjustment item related to playback of a program for each program identification information.

16 Claims, 15 Drawing Sheets

(56) References Cited

FOREIGN PATENT DOCUMENTS

| JP | 2006-222773 A | 8/2006 |
| JP | 2007-282077 A | 10/2007 |
| JP | 2008-172659 A | 7/2008 |
| JP | 2010-147813 A | 7/2010 |

OTHER PUBLICATIONS

Office Action issued in Japanese Patent Application No. 2011-044021 dated Jul. 3, 2012.
Office Action issued in Japanese Patent Application No. 2011-044021 dated Mar. 21, 2012.

* cited by examiner

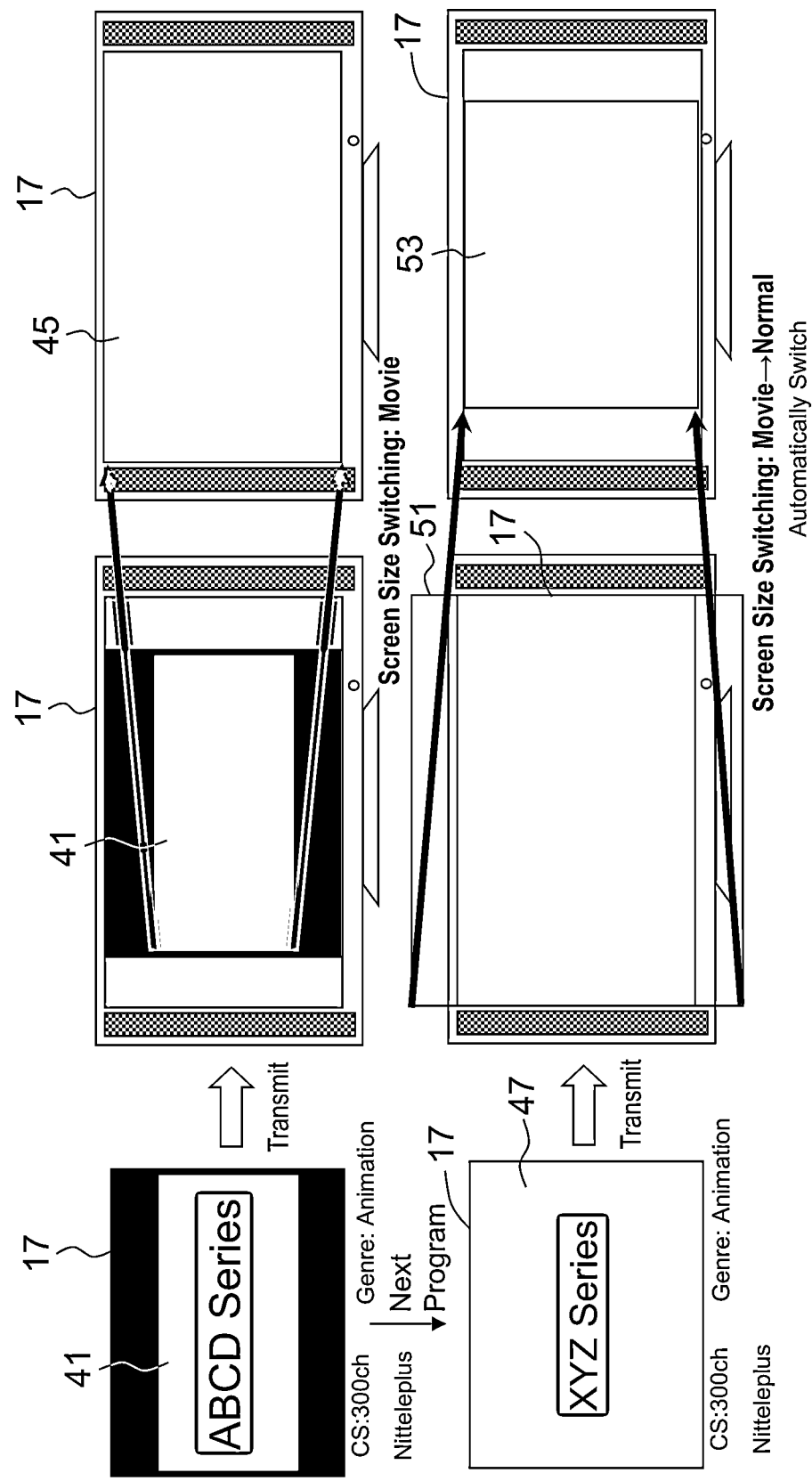

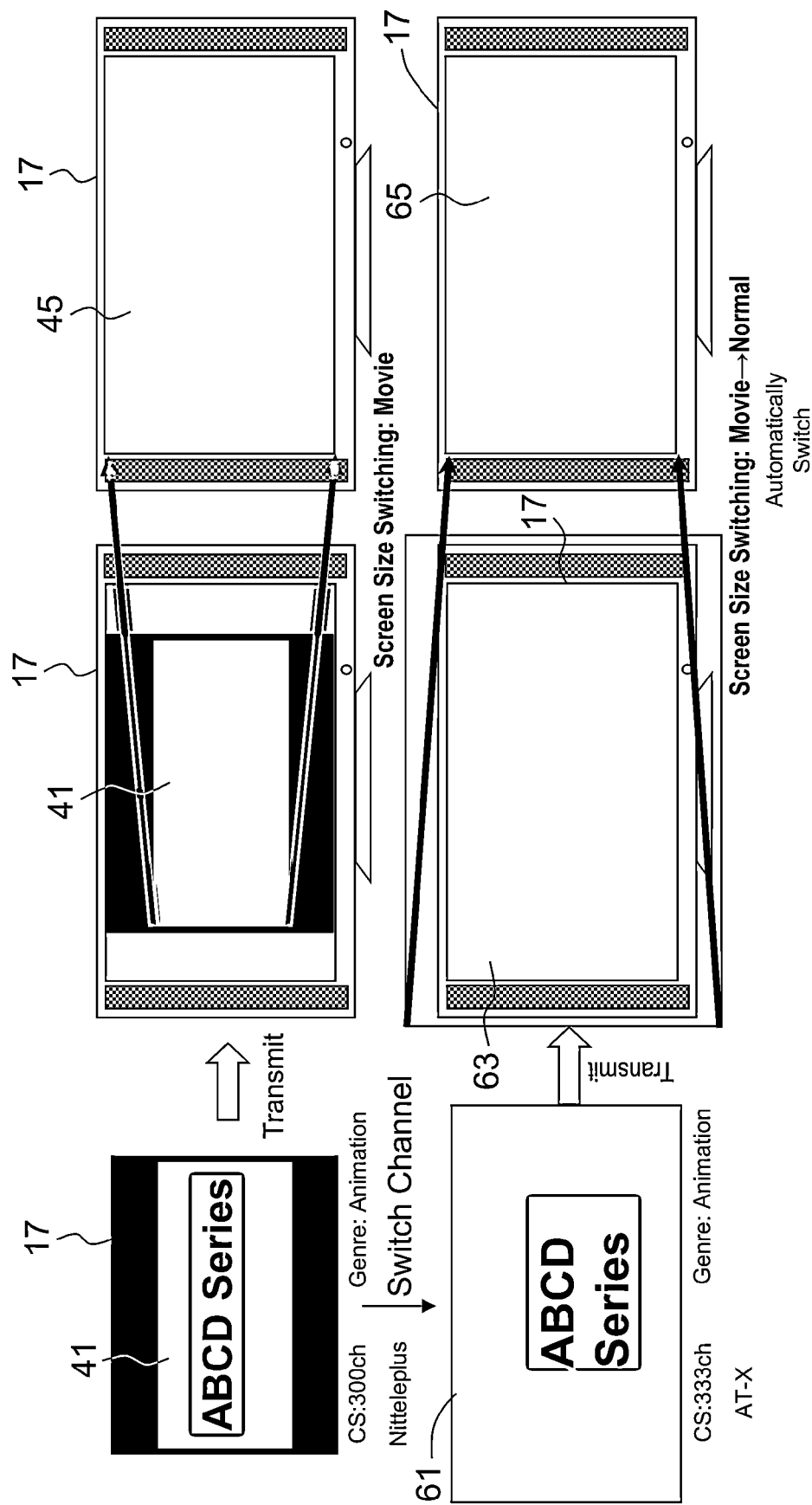

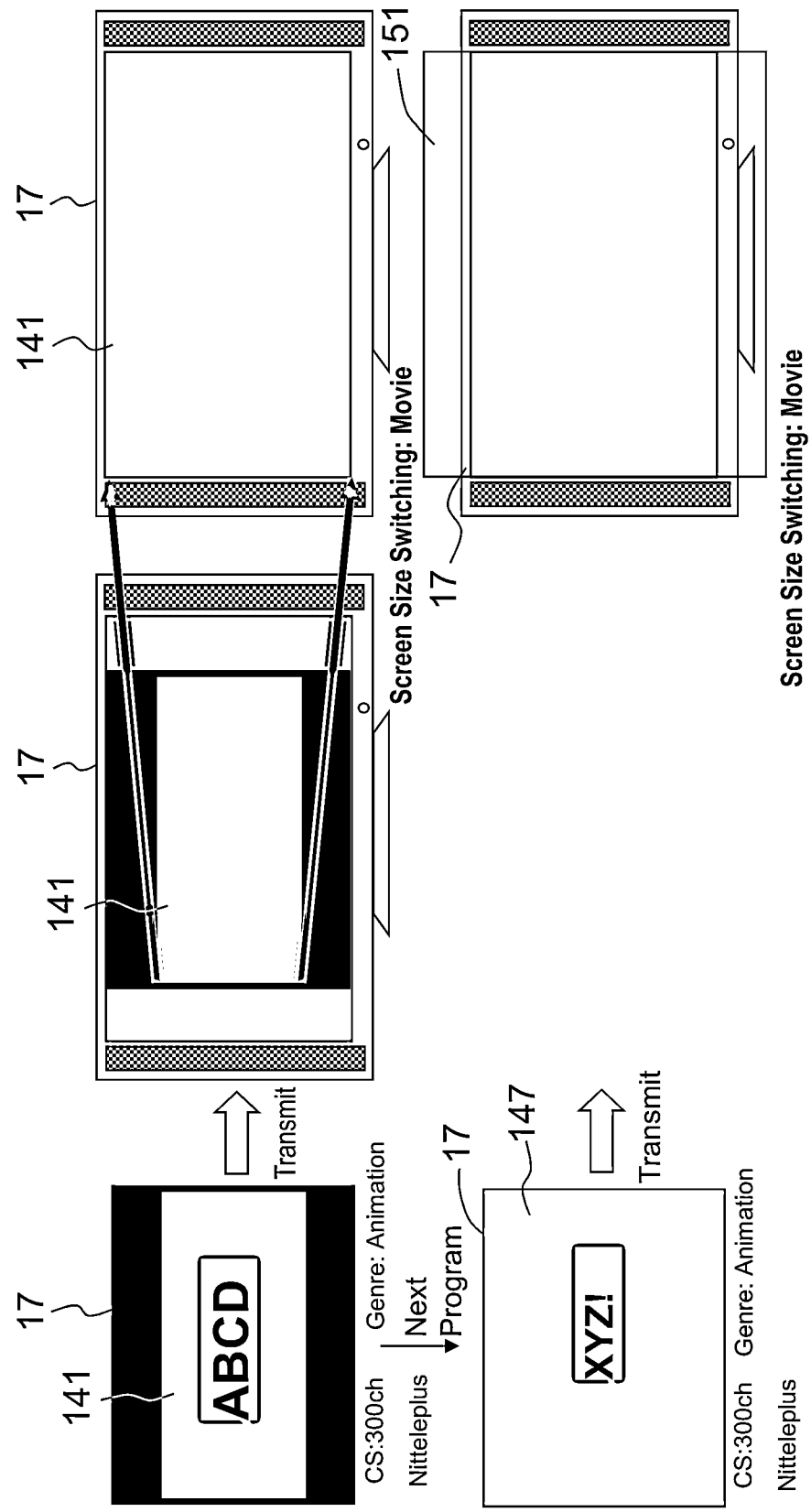

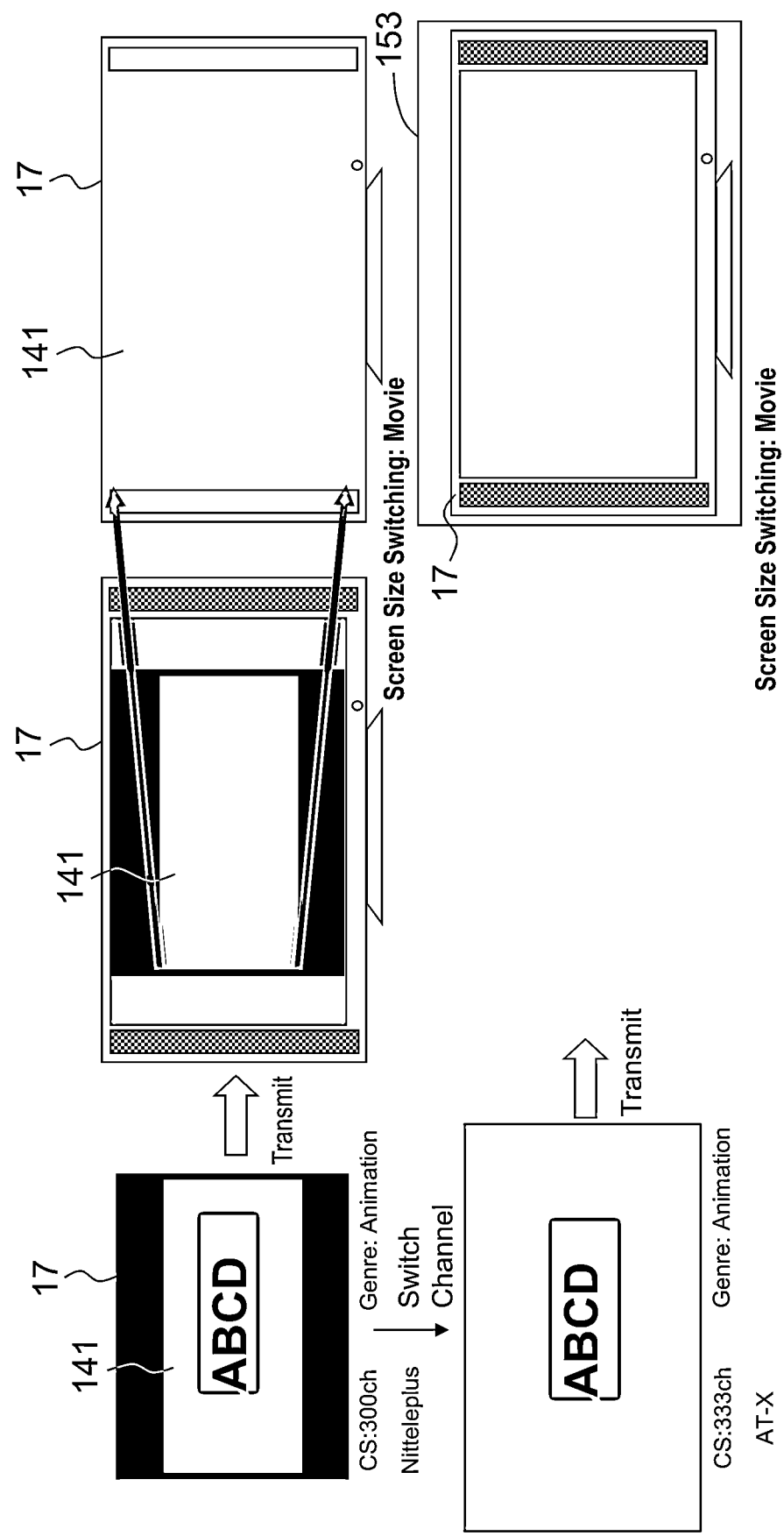

PLAYBACK DEVICE, TELEVISION RECEPTION DEVICE USING THE SAME, PLAYBACK METHOD, AND COMPUTER PROGRAM

TECHNICAL FIELD

The present invention relates to a program playback device and a television reception device using the same.

BACKGROUND ART

The functions of display devices (playback devices) such as television reception devices have become more complex, and the number of adjustment items for adjusting or setting such functions has been increasing correspondingly.

That is, both remote controllers and menus have, as the functions of television reception devices, adjustment items that are configured to be sequentially switched in accordance with a taste of a user, such as an audiovisual operation, display settings for programs, two screens, video adjustment, sound adjustment, and sound switching. A user, upon purchasing a television reception device, tries to operate and set some of the functions, but will gradually get bored and become reluctant to perform such operation. Finally, many of users will watch programs with the initial settings almost unchanged.

This is because while watching a television, a user feels like setting some function not only on the television body but on a program that he/she is watching. Thus, when the program ends and the next program starts, the user feels that the operation of restoring the previously set adjustment item to the initial state would be cumbersome.

The technology described in Patent Literature 1 below is adapted to identify the genre of a received broadcast program on the basis of EPG information, acquire an image quality parameter and a sound quality parameter as a combination of both the parameters from a website, as an adjustment item to be applied to the processing of an image and sound quality to obtain a reception state with a display quality and sound quality that are optimum for the identified genre, and execute video data processing and sound data processing for displaying video and outputting sound by applying the acquired image quality parameter and sound quality parameter.

Accordingly, by automatically performing optimum video processing and sound processing with a good harmony between the image quality and the sound quality, it is possible to reduce the burden on the user for setting the adjustment item.

CITATION LIST

Patent Literature

Patent Literature 1: JP 2007-282077 A

SUMMARY OF INVENTION

Technical Problem

However, when the adjustment item is automatically set in accordance with a genre as described in Patent Literature 1 above, the following problems would arise.

FIG. 14 is a diagram showing a view in which an adjustment item is automatically set in accordance with a genre. Herein, clear explanation will be given with reference to an example in which the audiovisual setting (display setting) is set as an adjustment item. As shown in FIG. 14, suppose that when content such as a program is displayed on a display unit 17 of a television, content (program) "ABCD" 141 whose genre is an animation is watched on CS300 ch (nitteleplus), for example. In such a case, when content intended for wide screens is transmitted to the television as a program source on the upper left of FIG. 14, it is common that a user wishes to watch the content as it is on a wide screen, and thus switch the setting of the screen size to a movie so that the content (program) "ABCD" 141 can be displayed on a wide screen over the entire display screen 17 through the screen size switching.

Next, when content (program) "XYZ!," which is a next program, is watched on the same CS300 ch (nitteleplus) and the setting of the image size is automatically switched to a movie as the genre of the program is also an animation, a display 151 will result in which part of the image lies off the display unit 17 of the television (part of the longitudinal sides lies off the display unit 17 as the horizontal widths are identical) through the screen size switching as the source display data 147 is not intended for wide screens. This will cause inconvenience to the user as he/she will watch the display 151 with part of the image lying off the screen.

FIG. 15 is also a diagram showing a view in which an adjustment item is automatically set in accordance with a genre. As shown in FIG. 15, when content (program) "ABCD" 141 whose genre is an animation is to be viewed on CS300 ch (nitteleplus) as a content source on the television, a source on the upper left of FIG. 15, which is content intended for wide screens, is transmitted to the television. Thus, it is common that a user wishes to watch the content as it is on a wide screen, and thus switch the setting of the screen size to a movie so that the content (program) "ABCD" 141 can be displayed on a wide screen over the entire display screen 17 through the screen size switching.

Next, suppose that the user switches the channel and attempts to watch the content (program) "ABCD" 141 on CS 333 ch (AT-X: Animation Theater-X). Then, if the screen size is switched to a "movie" as in the aforementioned screen size switching, the content, which is originally transmitted as content that can be displayed on a wide screen, will result in a wide-size display 153 that is beyond the size of the display screen 17 as the content is based on the source that can be displayed on a wide screen. This will cause inconvenience to the user.

As described above, it is found that when the setting of the screen size is automatically switched to a movie in accordance with a genre, there is a high possibility that inconvenience would occur if the genre of the next program is the same.

It is an object of the present invention to reduce changes to adjustment items as much as possible and eliminate the display inconvenience and the like that would occur when a program is switched.

Solution to Problem

The present invention is characterized in that a "program name" that is identified by a given channel (a network ID and a service ID) and an adjustment item such as an "audiovisual parameter" that is set by a user are stored in association with each other, and based on these, automatic adjustment is performed such that the correspondence is maintained even when channel switching that involves a change of a program occurs.

According to one aspect of the present invention, there is provided a playback device for playing back a program that includes a program information acquisition unit configured to acquire program identification information for identifying a program; and a memory unit configured to store an adjustment item setting file for setting an adjustment item related to playback of a program for each program identification information. Accordingly, it is possible to reduce changes to adjustment items as much as possible and eliminate the display inconvenience that would occur when a program is switched, for example.

The playback device preferably further includes an adjustment item reflecting unit configured to, when the adjustment item setting file includes program identification information corresponding to the acquired program identification information, reflect an adjustment item corresponding to the program identification information in playing back the program. Meanwhile, the playback device preferably further includes an adjustment item setting unit configured to, when the adjustment item setting file does not include the acquired program identification information, set the acquired program identification information and the set adjustment item in association with each other on the adjustment item setting file.

The program identification information includes a network ID or includes a channel and a program name that are identified by one of the network ID or a service ID.

The program name in the program identification information is preferably identified by a program title. The program name in the program identification information may also be identified by a series ID. The program may be a recorded program. The adjustment item may be referenced via a network.

The present invention may be a television reception device including any of the aforementioned playback devices.

According to another aspect of the present invention, there is provided a program playback method for playing back a program, including acquiring program identification information for identifying a program; and reflecting, when an adjustment item setting file that stores a correspondence between the program identification information and the adjustment item includes the acquired program identification information, an adjustment item corresponding to the program identification information in playing back the program.

There is also provided a program playback method for playing back a program, including acquiring program identification information for identifying a program; and setting, when an adjustment item setting file that stores a correspondence between the program identification information and the adjustment item does not include the acquired program identification information, the program identification information and a corresponding adjustment item on the adjustment item setting file.

The present invention may also be a computer program for causing a computer to execute the aforementioned program playback method, or a computer-readable recording medium having the program recorded thereon.

The present specification contains subject matter disclosed in the specification and/or drawings of Japanese Priority Patent Application JP 2011-044021 that forms the basis of the priority claim of the present application.

Advantageous Effects of Invention

According to the present invention, it is possible to reduce the processes of resetting adjustment items as much as possible when a given program is watched. In addition, by limiting the range of application of the automatic setting to the same program of the same channel, there is an advantage in that a display based on inconvenient automatic setting or the like that could occur when the channel is switched can be avoided.

BRIEF DESCRIPTION OF DRAWINGS

FIG. 12 is a diagram showing a first example of the screen switching in accordance with this embodiment;

FIG. 13 is a diagram showing a second example of the screen switching in accordance with this embodiment;

FIG. 14 is a diagram showing a first conventional example in which an adjustment item is automatically set in accordance with a genre; and FIG. 15 is a diagram showing a second conventional example in which an adjustment item is automatically set in accordance with a genre.

DESCRIPTION OF EMBODIMENTS

First Embodiment

Figure 1:
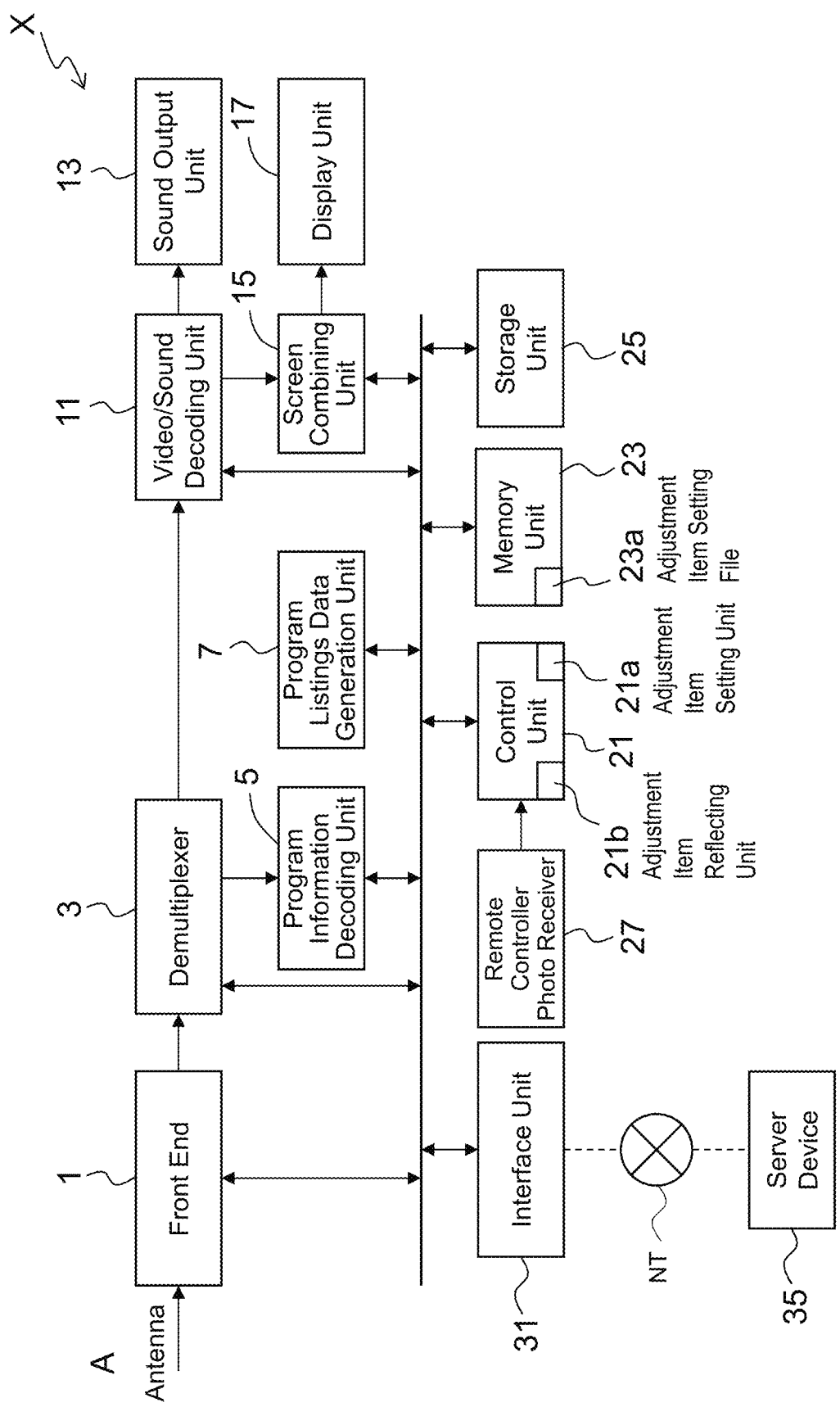
FIG. 1 is a functional block diagram showing an exemplary configuration of a television reception device having a program playback device in accordance with an embodiment of the present invention.

In this specification, "program identification information" refers to information that can identify a program. For example, in television broadcasting, a channel is identified by a network ID that represents a broadcast wave of a program (e.g., a digital terrestrial scheme, BS digital broadcasting, or CS digital broadcasting) and a service ID that represents the ID of a broadcasting station that broadcasts the program. Which program of the channel is being broadcast now can be identified by a program name. The "program identification information" can be acquired from program listings data in the broadcast wave. The series ID can also be included in the program identification information.

That is, the network ID and the service ID can be acquired from a NIT (Network Information Table). More specifically, TR-B14 (digital terrestrial broadcasting) Fascicle 2 or TR-B15 Fascicle 2 (BS) and Fascicle 4 (CS) define such IDs as an "NIT (Network Information Table)." Basically, the network ID can be acquired from the NIT, and the service ID can be acquired from the second loop of the NIT.

In the case of an IPTV or the like that provides content, a source is identified by the network ID, and content can be identified by the content ID. The content ID can be acquired from metadata on the content provided by a content provider.

The series ID is an ID indicating a series of programs that are broadcast in series, for example, in the same hour everyday or on a weekly basis like serial dramas. In the ARIB specifications, the series ID can be identified by a 16-bit character string (a digit sequence).

Adjustment items are items that can be set on a device to adjust the device, such as the display size and the sound volume, and include not only the adjustment items exemplarily shown in this specification but also adjustment items described in instruction manuals of liquid crystal television reception devices that can be acquired from the following URL and the like. The adjustment items that are based on the following tables and are described in the instruction manuals are only examples and are not intended to limit the range of the adjustment items.

1) Instruction Manual 1
LC-60LV3
URL: http://www.sharp.co.jp/support/aquos/doc/mn_lc60-40lv3.html
(For example, see pages 67, 68, 72, 78, 79, 80, 86, and 203.)

2) Instruction Manual 2
LC-40DR3
URL: http://www.sharp.co.jp/support/aquos/doc/mn_lc40dr3.html
(For example, see pages 78, 89-91, 113, and 227.)

In this specification, the term "program" is used as a term with a broad concept that encompasses computers including the Internet content and recorded programs.

TABLE 1

| Audiovisual Operation |
| --- |
| Screen Size Switching |
|   1080I |
|     Full 1 |
|     Full 2 |
|     Dot by Dot |
|     Smart Zoom |
|     Wide 16:9 |
|     Movie |
|   480I |
|     Normal |
|     Smart Zoom |
|     Wide 4:3 |
|     Movie |
|     Full |
|     Wide 16:9 |

Table 1 is a table showing examples of adjustment items related to the audiovisual operation. For example, adjustment items for each of 1080I and 480I are described as the screen size switching. That is, for 480I, for example, any of the following adjustment items can be selected and set: normal, smart zoom, wide 4:3, movie, full, and wide 16:9. For 1080I, any of the following adjustment items can also be selected: full 1, full 2, dot by dot, smart zoom, wide 16:9, and movie.

TABLE 2

| Screen Display Setting |
| --- |
| Character Size |
|   Normal |
|   Large Characters |
| Subtitle Display |
|   On-Screen |
|     Display: ON |
|   Out-of-Screen |
|     Subtitles at the Top: Display ON |
|     Subtitles at the Bottom: Display ON |
|   Display OFF |

Table 2 is a table showing examples of adjustment items related to the screen display.

For example, normal, large characters, or the like can be selected as the character size, and on-screen, out-of-screen, display OFF, or the like can be selected as the subtitle display. Further, regarding each adjustment item, subtitles at the top: display ON, subtitles at the bottom: display ON, or the like can be set for the out-of-screen, for example.

TABLE 3

| Two Screens |
| --- |
| Single Screen |
| Two Screens of Equal Size |
| Two (Large/Small) Screens (1) |
| Two (Large/Small) Screens (2) |
| PinP |
|   Upper Left |
|   Upper Right |
|   Lower Left |
|   Lower Right |

Table 3 is a table showing examples of adjustment items related to a multi-screen display, herein, a two-screen display.

For example, a single screen, two screens of equal size, two (large/small) screens (1) and (2), PinP (Picture in Picture), or the like can be set. With regard to PinP, the display position thereof can be set.

TABLE 4

| Sound Switching and the Internet |
| --- |
| Dual/Mono |
|   Main |
|   Sub |
|   Main + Sub |
| Stereo |
|   Sound 1 |
|   Sound 2 |
| Internet |
|   TV |
|   TV + Internet |
|   Two Screens + Internet |

Table 4 is a table showing examples of adjustment items related to the sound switching and the Internet. For the sound switching, dual/mono (main language, sub-language, or main language+sub-language) or the like can be set. For the stereo, sound 1, sound 2, or the like can be set. Further, when display of the Internet is possible, TV, TV+Internet, Two screens+Internet, or the like can be set.

TABLE 5

Video Adjustment

AV Position (Image Quality Switching)
    Automatic
    Normal
    Movie
    Game
    AV Memory
    Photo
    Dynamic
    Dynamic (Fixed)
Brightness Sensor
    OFF
    ON Table 5 is a table showing examples of the setting of items related to the video adjustment. As the adjustment item related to the video adjustment, automatic, normal, movie, game, AV memory, photo, dynamic, or dynamic (fixed) can be set as the AV position (image quality switching). In addition, if a brightness sensor is provided, such sensor can be set On or OFF.

TABLE 6

Sound Adjustment

Automatic Volume
    Strong
    Medium
    Weak
    OFF
Surround
    Automatic: Surround is automatically turned ON when the input sound is 5ch or greater.
    ON: Setting that allows 3D surround to be enjoyed
    OFF
Sound Quality Correction
    Mode 1: No Correction is applied. This is the setting faithful to the original sound
    Mode 2: This is the setting suitable for movies, music programs, etc.
    Mode 3: This is the setting suitable for news programs, etc.
Listenability of Voice
    Mode 1: Normal sound quality with uniform sound volume
    Mode 2: Milder sound quality than normal
    Mode 3: Clearer sound quality than normal
    None Table 6 is a table showing examples of the setting of the sound adjustment. For the automatic volume, strong, medium, weak, or OFF can be set. For the surround, automatic, ON, or OFF can be set. For the sound quality correction, the listenability of voice, and the like, any of a plurality modes can also be set.

Items that are referenced from the program information (when a series ID described below is used) include a series ID (an ID for handling a plurality of programs as a single group), a network ID (BS, CS, or digital terrestrial), a service ID (channel), and the like. Further, items that are referenced from the program information (when a program name described below is used) include a program name (a program name excluding subtitles, the number of talks, special characters for broadcasting (Text, Again, Bilingual) and the like, a network ID (BS, CS, or digital terrestrial), a service ID (channel), and the like.

Such adjustment items may also be acquired from a content provider, for example, via a network.

Hereinafter, a program playback device in accordance with a first embodiment of the present invention will be described with reference to a television reception device as an example. With regard to the adjustment items, description will be made using the display-related adjustment items shown in Tables 1 to 3 as examples. In the first embodiment, an example in which an adjustment item is stored and set on the basis of a program name will be described.

A television reception device X shown in FIG. 1 includes a front end 1, which includes a tuner and the like for selecting a broadcast program from a broadcast signal received from an antenna A, a demultiplexer 3 for separating a multiplexed signal into a video signal and a sound signal, a video/sound decoding unit 11 for decoding a coded video signal and sound signal, a sound output unit 13 for outputting the decoded sound, a program information decoding unit (which combines the function of a program information acquisition unit) 5 for decoding program information from the output of the demultiplexer 3, a program listings data generation unit 7 for generating electronic program listings (EPG) data from the acquired program information, a screen combining unit 15 that combines video with program listings data and the like, and a display unit (display) 17 for displaying the video resulting from the combining process in the screen combining unit 15.

Further, the television reception device X also includes a control unit (CPU) 21 for controlling the entirety of each functional unit, a memory unit (RAM, ROM) 23 for storing programs and the like for causing the CPU 21 to execute various processes, a storage unit (HDD) 25 such as, though optional, a hard disk for recording programs and the like, and a remote controller photo receiver 27 that receives a remote control signal from a remote controller device. The television reception device X may also include an interface unit 31 that constitutes an interface for acquiring content via a network NT with a server device 35 that provides content and the like. Note that the storage unit (HDD) 25 is provided for a television that combines the function of a recorder, and is typically not provided for a television for exclusive use. It is also possible to use information about the adjustment items through downloading from the server device 35.

Further, in this embodiment, the memory unit 23 has an adjustment item setting file (table) 23a for setting the adjustment items. Examples of the content of the table will be described later. Further, there are provided an adjustment item setting unit 21a and an adjustment item reflecting unit 21b that are controlled by the control unit (CPU) 21 on the basis of programs recorded in the ROM of the memory unit 23. The adjustment item setting unit 21a has a function of setting an adjustment item corresponding to a program name acquired by the program information acquisition unit 5 or the like on the adjustment item setting file 23a on the basis of a process shown in the flowchart described below. The adjustment item reflecting unit 21b has a function of reflecting (automatically setting) an adjustment item, which is identified on the basis of the adjustment item setting file 23a and a new program name acquired by the program information acquisition unit 5 or the like, on the device on the basis of a process shown in the flowchart described below.

TABLE 7

Examples of the Stored Items (when program names are used)

| Network ID | Service ID | Program Name | Screen Size Switching (SD) | Subtitle Display | Bilingual Broadcast |
|---|---|---|---|---|---|
| Standard Settings | | | | | |
| Not Set | Not Set | Not Set | Normal | OFF | Main + Sub |
| 0x0004 (BS) | Not Set | Not Set | Normal | ON | Main + Sub |
| 0x0004 (BS) | 0x065 (NHK101) | Not Set | Normal | ON | Sub |
| 0x0006 (CS) | 0x12C (300ch) | ABCD | Movie | OFF | Main + Sub |
| 0x7800 (Digital Terrestrial) | 0x00B (011ch) | X0XX0 | Normal | ON (Bottom) | Main + Sub |
| 0x8004 (Digital Terrestial) | 0x03D (061ch) | News | Normal | OFF | Sub |
| 0x7780 (IPTV) | Not Set | Not Set | Smart Zoom | ON | Main + Sub |

Table 7 is a table showing examples of the items stored in the adjustment item setting file 23a. In Table 7, the network ID, the service ID, the program name, the screen size switching (standard image quality SD), subtitle display, and bilingual broadcast are given as examples of the items that can be set. Among them, for the television broadcasting, a channel is identified by the network ID and the service ID, while for an IPTV and the like, a source is identified by the network ID.

Such program information, in particular, information that is necessary to identify a program will be referred to as "program identification information" in this specification. Hereinafter, description will be made of an example in which the program identification information is a program name or a series ID. The adjustment items in Table 7 include items about whether the screen size switching (SD) should be set to normal, movie, or smart zoom, whether the subtitle display should be set OFF, ON, or ON (bottom), and whether the bilingual broadcast should be set to main language, sub-language, or main language+sub-language, like the items shown in Tables 1 to 6. The "stored items" described below refer to, for example, program identification information and adjustment items set for each program identification information that are stored in the adjustment item setting file 23a for each row of Table 7.

Referring to the rows in the column direction of Table 7, an example in which the top row indicates the standard settings will be described in which the network ID, the service ID, and the program name are not set, the screen size switching (standard image quality SD) is normal, the subtitle display OFF, and the bilingual display is main language+sub-language.

Referring to the settings in the second row from the top, the network ID is 0x0004 (BS), the service ID and the program name are not set, the screen size switching (standard image quality SD) is normal, the subtitle display is ON, and the bilingual broadcast is main language+sub-language. This indicates that the settings are applied to any channel or program of a BS broadcast. That is, as long as the network ID is the same, adjustment items that are set can be uniform independently of the channel or the program name. It should be noted that the "Not Set" field can be set by entering "Not Set" through a menu screen (GUI) or the like. Alternatively, a manufacturer can set "Not Set" for the standard items and the like by default, or such settings can also be acquired through downloading from a server of the manufacturer.

Referring to the third row from the top, when the network ID is 0x0004(BS), the service ID is 0x065 (NHK101), and the program name is not set, the screen size switching (standard image quality SD) is normal, the subtitle display is ON, and the bilingual broadcast is sub-language. This indicates that the settings are applied to any program name as long as it is a program of NHK 101 of the BS broadcast. That is, as long as each of the network ID and the service ID is the same, adjustment items that are set can be uniform independently of the program name.

Referring to the fourth row from the top, when the network ID is 0x0006(CS), the service ID is 0x12C (300ch), and the program name is "ABCD," the screen size switching (standard image quality SD) is movie, the subtitle display is OFF, and the bilingual broadcast is main language+sub-language. This indicates that the settings are applied to the program "ABCD" on 300 ch of the CS broadcast. That is, as long as each of the network ID and the service ID is the same, adjustment items that are set can be uniform.

Referring to the fifth row from the top, when the network ID is 0x7800 (digital terrestrial broadcast), the service ID is 0x00B (011ch), and the program name is "XOXXO," the screen size switching (standard image quality SD) is normal, the subtitle display is ON (bottom), and the bilingual broadcast is main language+sub-language. This indicates that the settings are applied to the program "XOXXO" on 011 ch of digital terrestrial broadcast. That is, as long as each of the network ID and the service ID is the same, adjustment items that are set can be uniform.

Referring to the sixth row from the top, when the network ID is 0x8004 (digital terrestrial broadcast), the service ID is 0x03D (061ch), and the program name is "news," the screen size switching (standard image quality SD) is normal, the subtitle display is OFF, and the bilingual broadcast is sub-language. This indicates that the settings are applied to the program "news" on 061 ch of digital terrestrial broadcast. That is, as long as each of the network ID and the service ID is the same, adjustment items that are set can be uniform.

Referring to the seventh row from the top, in the case of the Internet content whose network ID is 0x7780 (IPTV), and whose service ID and program name are not set, the screen size switching (standard image quality SD) is smart zoom, the subtitle display is ON, and the bilingual broadcast is main language+sub-language. This indicates that the settings are applied to any IPTV whose network ID is 0x7780. That is, adjustment items that are set on IPTVs identified by the network ID can be uniform.

As described above, by storing the adjustment items (which are exemplarily shown herein) such as the screen size switching, subtitle display, and bilingual broadcast for a program identified by the network ID, the service ID, and/or the program name, it becomes possible to display the same program again with the same adjustment items next time.

It should be noted that a user may also set the standard settings differently. Further, it is also possible to display a setting screen such as the one shown in Table 7 on the menu screen to allow entry of settings by the user. It is also possible to provide a reset button for deleting all settings and restoring the settings to those at the time of purchase, or allow recommended adjustment items to be downloaded from a network and stored.

Figure 2:
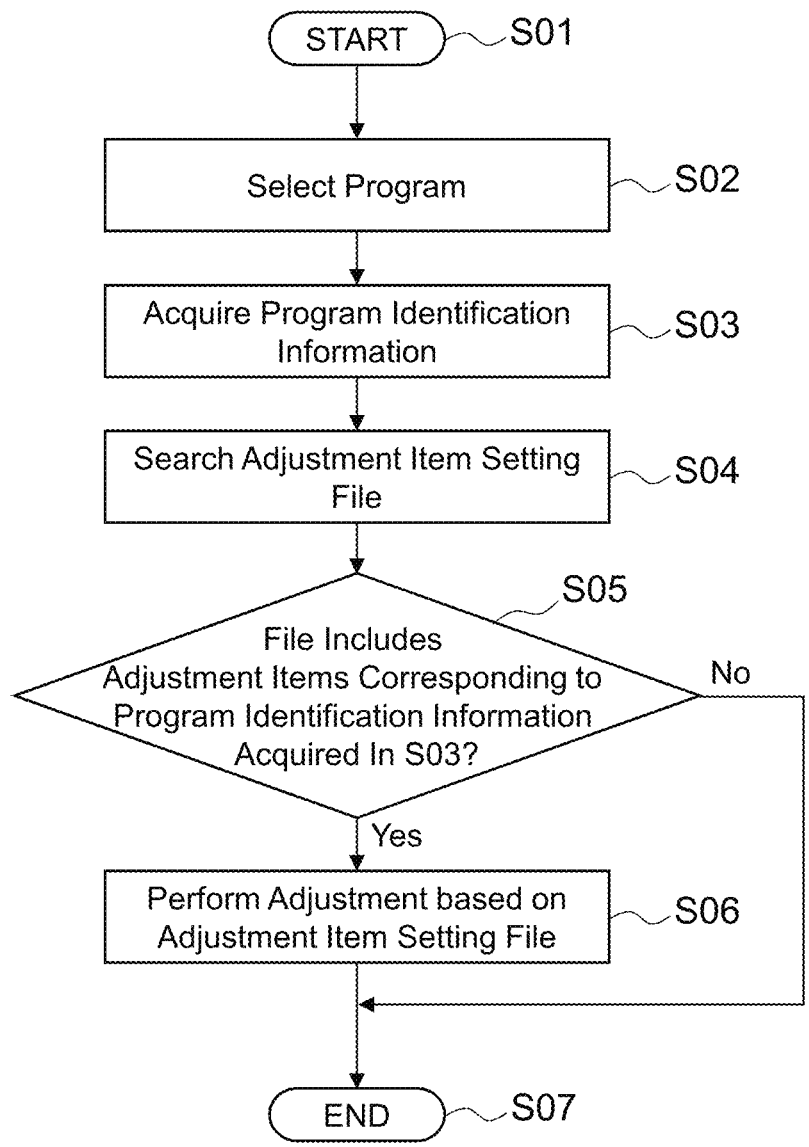
FIG. 2 is a flowchart showing a flow of a process of resetting the adjustment items in accordance with a first embodiment of the present invention.

FIG. 2 is a flowchart showing a flow of a process of resetting the adjustment items in accordance with the first embodiment of the present invention. As shown in FIG. 2, when a process is started (step S01) and a new program is selected through program switching and the like in step S02, the program information acquisition unit (which combines the function of the program information decoding unit) 5 acquires program identification information that identifies the program in step S03, and then in step S04, searches the adjustment item setting file 23a on the basis of the program identification information acquired in step S03 as a search key. In step S05, if the adjustment item setting file 23a includes adjustment items corresponding to the program identification information acquired in step S03 (Yes), adjustment of the device is performed on the basis of the adjustment items in the adjustment item setting file 23a, and the process is terminated (step S07). If the result of step S05 is No, the current settings (the adjustment items) of the device are maintained. Through such a process, appropriate adjustment corresponding to the adjustment items set for a program identified by the program identification information is performed.

Figure 3:
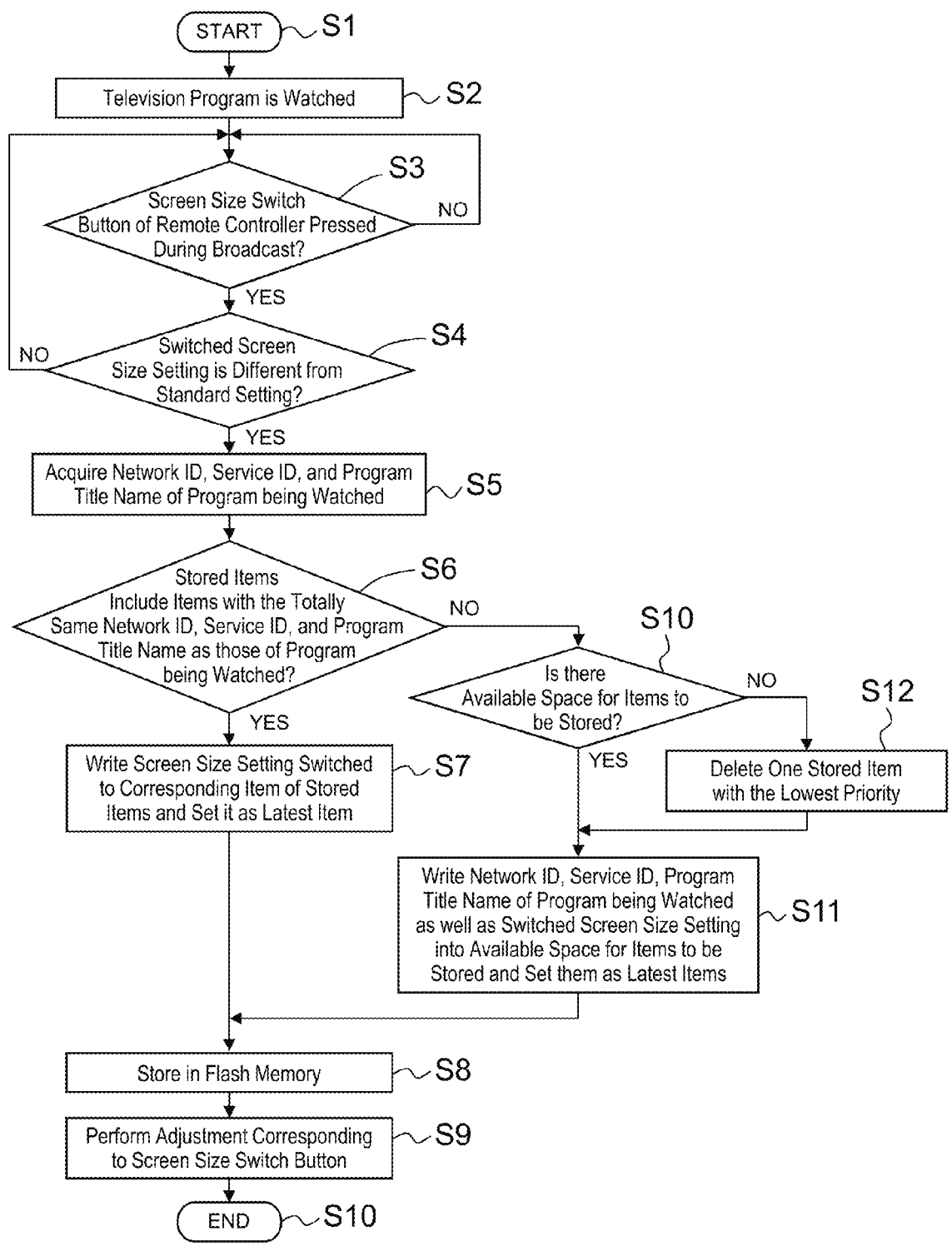
FIG. 3 is a flowchart showing a flow of a process of storing the settings in accordance with the first embodiment of the present invention, which is a chart showing an example in which an adjustment item related to the screen size switching is stored for each program name.

FIG. 3 is a flowchart showing a flow of a process of storing the settings in accordance with this embodiment, which is a chart showing an example in which an adjustment item related to the screen size switching is stored for each program name. First, in step S1, a process of the adjustment item setting unit 21a is started (START), and while a television program is watched (played back) in step S2, it is determined if the screen size switch button of the remote controller was pressed during the broadcast in step S3. If the result of step S3 is YES, the process proceeds to step S4. In step S4, it is determined if the switched screen size setting differs from that of the standard settings. If the result of step S4 is NO, the process returns to step S3. If the result of step S4 is YES, the process proceeds to step S5, and the program information acquisition unit 5 acquires from a broadcast wave and the like the network ID, the service ID, and the program title name of the program that is being watched.

Next, the process proceeds to step S6, and it is determined if the stored items of the adjustment item setting file 23a in Table 7 include items with the totally same network ID, service ID, and program title name as those of the program that is being watched. If the result of step S6 is YES, the process proceeds to step S7, and the current settings are overwritten with the screen size setting switched to the adjustment item corresponding to the program identification information (in this embodiment, the screen size switching). That is, such a stored item is written over and stored in the adjustment item setting file 23a in the flash memory of the memory unit 23 (step S8). In this case, as the item corresponds to an item for which the switch button was pressed in step S3, such an item is determined to be the stored item that has been set most recently (a stored item with the highest priority, namely, an item that is less likely to be deleted in step S12 described below). Next, the screen size is adjusted corresponding to the screen size switch button (step S9), and the process is terminated (step S10: END).

If the result of step S6 is NO, the adjustment item setting file 23a does not include the corresponding item. Thus, first, in step S10, it is determined if the adjustment item setting file 23a in the memory has an available space to be written. If the result of step S10 is YES, the adjustment item setting file 23a has an available space to be written with a new item to be stored. Thus, the process proceeds to step S11, and the network ID, the service ID, the program title name, and the switched screen size setting of the program being watched are written to the adjustment item setting file 23a, with the priority thereof set highest. Herein, it is assumed that the priority is given to each row of the adjustment item setting file 23a in Table 7. The newly added stored items (row) have the highest priority. Next, the process proceeds to step S8. It should be noted that the setting "Not Set" is not set on the basis of the process of acquiring program identification information such as the one described above. Thus, items stored in the rows that include items that are not set (e.g., the first to third rows and the seventh row in Table 7) are not the targets to be deleted. With regard to the items stored in the rows having no items that are not set (e.g., the fourth to sixth rows in Table 7), for example, the upper rows have higher priorities, and are not set as the targets to be deleted.

If the result of step S10 is NO, the adjustment item setting file 23a has no available space to be recorded with the items to be stored. Thus, the process proceeds to step S12, and a single stored item with the lowest priority is deleted from the adjustment item setting file 23a, and then, the process proceeds to step S11. The stored item with the lowest priority is, for example, an old stored item for which the operation of acquiring information is rarely performed in step S5.

As described above, according to the aforementioned process, while a given program is watched, the network ID, the service ID, and the program name of the program are acquired, and if such items are new items, they can be stored in the adjustment item setting file 23a. Accordingly, when the same program is watched next time, there is an advantage in that the screen size can be automatically switched by referencing the corresponding adjustment items in the adjustment item setting file 23a.

Figure 4:
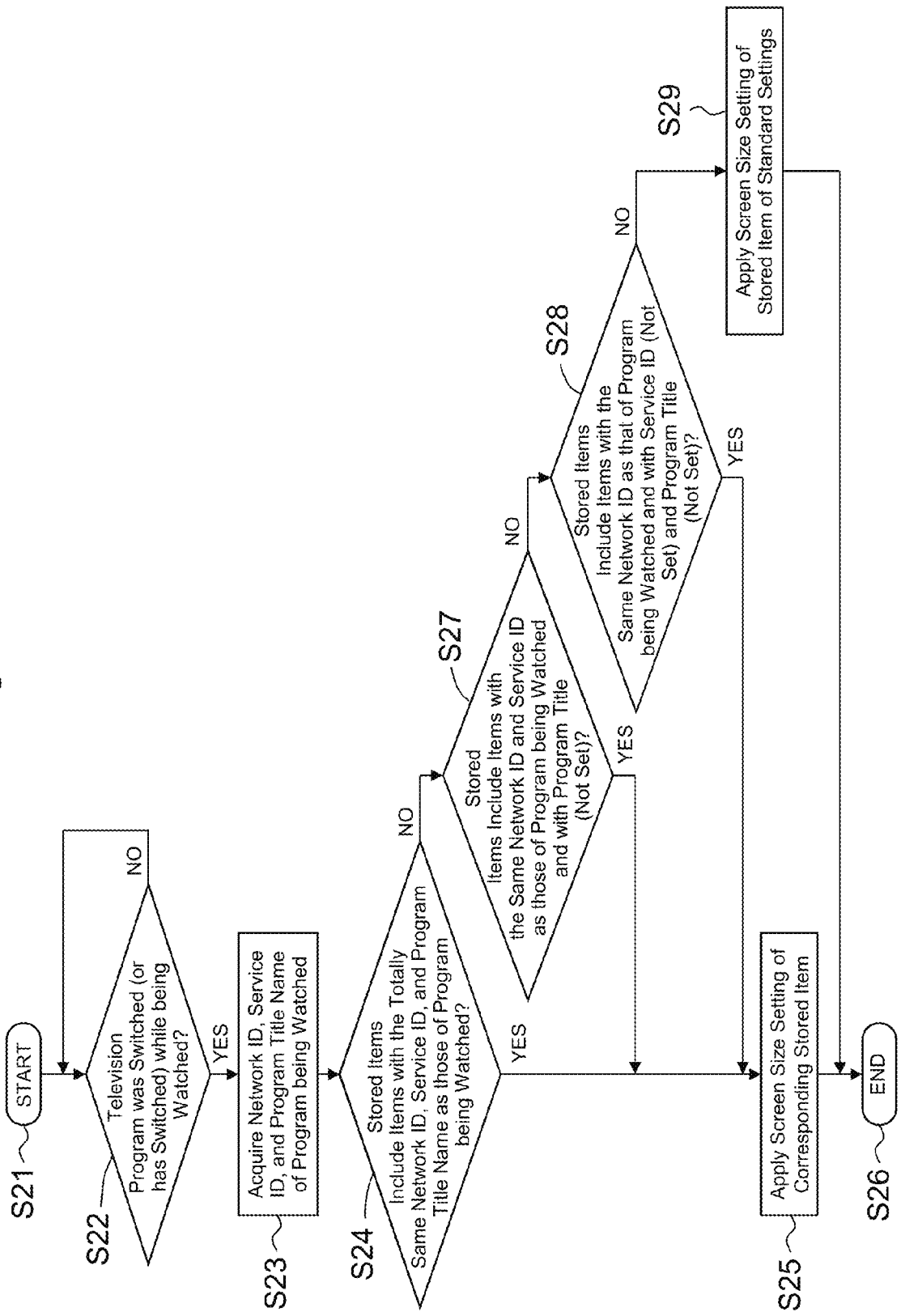
FIG. 4 is a flowchart showing a flow of a process of reflecting the settings in accordance with the first embodiment of the present invention.

FIG. 4 is a flowchart showing a flow of a process of reflecting the settings, which is performed by the adjustment item reflecting unit 21b. First, as shown in FIG. 4, in step S21, a process of the adjustment item reflecting unit 21b is started (START), and in step S22, while a television program is watched, if it is detected that the program is switched (or the program has switched), the program information acquisition unit 5 acquires the network ID, the service ID, and the program title name of the program that is being watched in step S23. Next, in step S24, it is determined if the stored items include items with the totally same network ID, service ID, and program title name as those of the program being watched, with reference to the adjustment item setting file 23a. If the result of step S24 is YES, the stored items already exist. Thus, the screen size setting of the corresponding stored items is set on the device in step S25, and the process is terminated (END: step S26).

If the result of step S24 is NO, the process proceeds to step S27, and it is determined if the stored items include items with the same network ID and service ID as those of the program being watched and with a program title (not set) (e.g., items on the third row of Table 7), that is, if the stored items include items whose program title is not set. If the result is YES, the process proceeds to step S25, and the screen size setting corresponding to the stored item is set on the device. If the result is NO, it is determined if the stored items include items with the same network ID as that of the program being watched and with a service ID (not set) and a program title (not set) (e.g., items in the second row of Table 2), that is, it is determined if there is any item with a service ID not set and a program title not set. If the result is YES, the process proceeds to step S25, and the screen size setting corresponding to the stored item is set on the device. If the result is NO, it is determined in step S28 if the stored items include items with the same network ID as that of the program being watched and with a service ID (not set) and a program title (not set). If the result of step S28 is YES, the process proceeds to step S25, and if the result of step S28 is NO, the process proceeds to step S29. In step S29, the screen size setting of the stored item of the standard settings in the top row (a row with the high priority) of Table 7 is set on the device, and the process is terminated (step S26). As described above, it is determined if the adjustment item setting file 23a includes adjustment items corresponding to the acquired program identification information. If the adjustment item setting file 23a is determined to include such items, the program is played back with the screen size setting or the like set on the device on the basis of the adjustment items. In this case, only the program identification information includes items that are not set. Thus, even if all pieces of the program identification information do not match, as long as pieces of the program identification information excluding the items that are not set match, the program is played back on the basis of the adjustment items corresponding to the program identification information. Finally, if there is no piece of the program identification information that matches, the program is played back on the basis of the adjustment items of the standard settings. Accordingly, it is possible to control the device to play back the program while giving priority to the adjustment items corresponding to the program. Thus, desired adjustment is can be performed.

Through the aforementioned processes, when a program with a program name corresponding to an item stored in the adjustment item setting file 23a is watched or the like after a storing/setting process, there will be not need to switch the screen size to a desired size each time by automatically performing the same screen size switching. In addition, as such a process of automatically switching to the same adjustment item can be configured to be performed only when the program name is the same, for example, it is possible to prevent a program with a different program name or the like from being played back based on similar settings.

Figure 5:
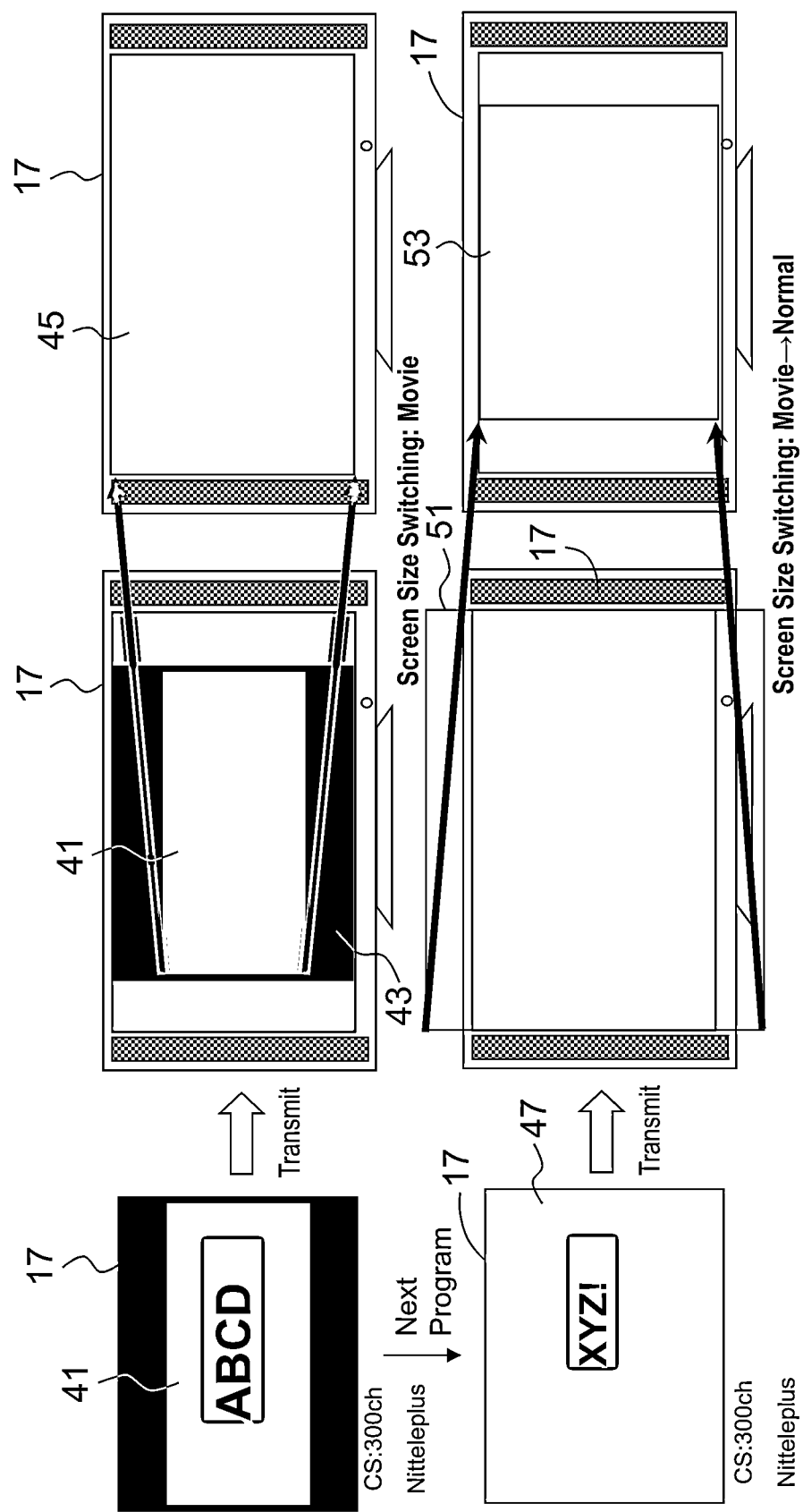
FIG. 5 is a diagram showing a first example of the screen switching.

FIG. 5 is a diagram showing a first example of the screen switching based on the aforementioned process. Description will be made with reference to FIGS. 2 to 4 as appropriate. As shown in the display of the upper left end of FIG. 5, a video source of an animation program "ABCD" on CS300 ch (nitteleplus) has a ratio of 16:9. However, as the video is transmitted with an aspect ratio of 4:3 (fixed) of 480I, it is transmitted in letterbox format (a state in which the video has black bars above and below it). As a user wishes to watch the program "ABCD" with the screen size switched to (480I: Movie), the item related to the screen switching is stored through a process such as the one shown in FIG. 3 (the screen display on the display unit 17 changes from 41 to 45, for example).

The next program "XYZ!" is an old animation. Thus, the video itself has a ratio of 4:3 and is transmitted with a letterbox cancelled. The user wishes to watch the program "XYZ!" with the screen size switched to (480I: Normal), but the screen size will be switched to (480I: Movie) according to the conventional technology as the genre of the program is an animation. However, based on FIG. 4, a new screen size is not set even if the program name differs, and only when adjustment of the program has been registered, the screen size is changed accordingly.

Further, when the program is switched to the animation program "ABCD" on CS300 ch (nitteleplus), the screen size switching (480I: Movie) is applied to the device with reference to the adjustment item setting file 23a on the basis of a process such as the one shown in FIG. 4 so that the program can be played back (watched).

Figure 6:
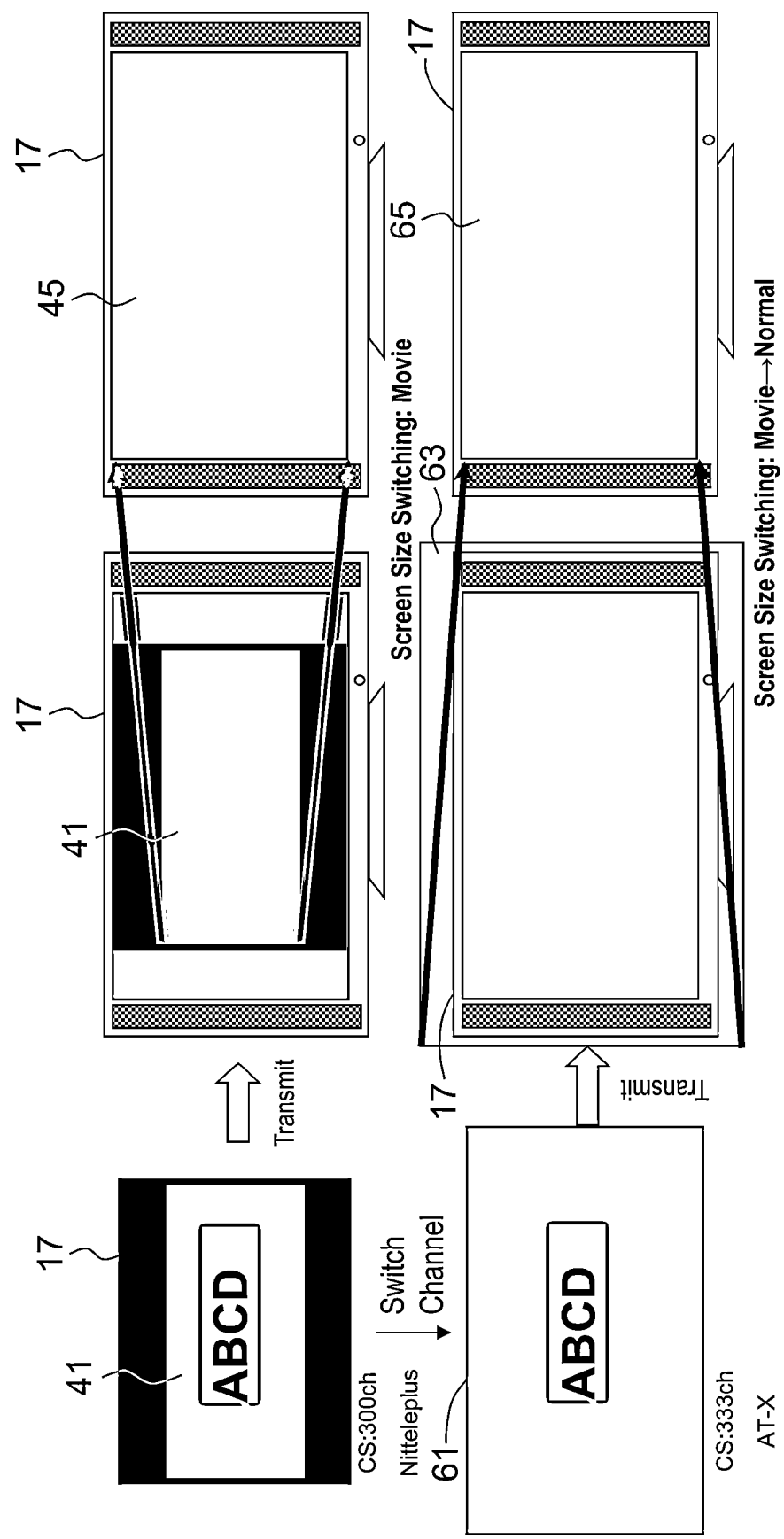
FIG. 6 is a diagram showing a second example of the screen switching.

FIG. 6 is a diagram showing a second example of the screen switching based on the aforementioned process.

A video source of a program "ABCD" (animation) on CS300 ch (nitteleplus) has a ratio of 16:9. However, as the video is transmitted with an aspect ratio of 4:3 (fixed) of 480I, it is transmitted in letterbox format (a state in which the video has black bars above and below it). As a user wishes to watch the program with the screen size switched to (480I: Movie), the item related to the screen switching is stored through a process such as the one shown in FIG. 3 (the screen display on the display unit 17 changes from 41 to 45, for example).

Meanwhile, when the channel is switched to CS 333 ch (AT-X), the video is not transmitted in letterbox format as it is transmitted with an aspect ratio of 16:9 (fixed) of 480I according to AT-X though the same program "ABCD" has been broadcast. The user wishes to watch the program with the screen size switched to (480I: Normal), but according to the conventional technology, the screen size will be switched to (480I: Movie) when the title of the program is the same. However, based on FIG. 4, only when adjustment of the program has been registered, the screen size is changed accordingly.

Next, when the program is switched to the program "ABCD" (animation) on CS300 ch (nitteleplus), the screen size switching (480I: Movie), which is stored in the adjustment item setting file 23a on the basis of the process shown in FIG. 3, is applied with reference to the adjustment item setting file 23a so that the program "ABCD" can be watched with the screen size switched.

Figure 7:
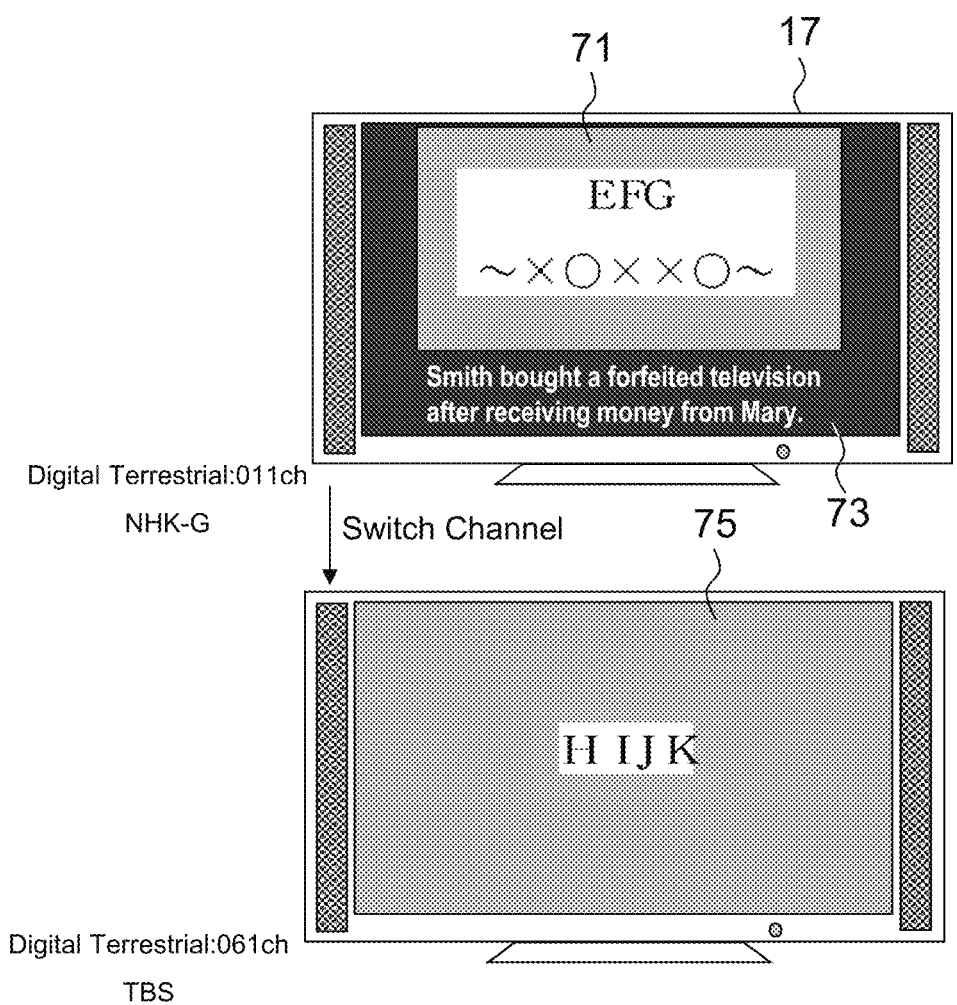
FIG. 7 is a diagram showing a third example of the screen switching.

FIG. 7 is a diagram showing a third example of the screen switching based on the aforementioned process. A user wishes to watch a program "Serial TV Drama EFG, XOXXO" 71 on 011 ch (NHK) in the morning digital terrestrial broadcasting with subtitles 73 displayed at the bottom as he/she will watch it with his/her hearing-impaired grandparents. Thus, the adjustment items are set on the basis of the process shown in FIG. 3. Then, after the grandparents return to their room, the user wishes to watch "HIJK" on 061 ch (TBS) of the digital terrestrial broadcasting without the subtitles displayed. Even in such a case, if the setting is performed based only on the genre, the same adjustment items will be applied. However, as both the channel ID and the program name are different in this case, if they have been registered in advance, the program "HIJK" can be watched based on the new setting.

Next, when the program is switched to the program "Serial TV Drama EFG, XOXXO" 71 on 011 ch (NHK) in the morning digital terrestrial broadcasting, a setting of the display of the subtitles 73 at the bottom can be applied with reference to the adjustment items set in the adjustment item setting file 23a through the aforementioned process, so that the program can be watched the subtitles 73 displayed at the bottom.

In a fourth example of the screen switching (bilingual broadcast) based on the aforementioned process, a case is supposed where, for example, a user who is learning Chinese wishes to listen to the reading of Chinese poems in the sub-language only for a NHK educational program named "New Chinese Poems XX" of all the bilingual broadcasts. In such a case, a new adjustment item is set on the adjustment item setting file 23a through the process shown in FIG. 3. Conventionally, even when the user does not particularly wish to listen to the other programs in the sub-language, the setting of the sub-language for bilingual broadcasts will be applied if the genre of the programs is the same. However, in the method of this embodiment, if the program is registered in advance, a new setting will be set as long as a program name differs or a channel differs. Thus, even programs of the same genre can be watched not in the sub-language for bilingual broadcasts.

Further, when the program has switched to the NHK educational program "New Chinese Poems XX" that is being broadcast now, the user can listen to the reading of Chinese poems with the language set to the sub-language for bilingual broadcasts with reference to the adjustment item in the adjustment item setting file 23a set above.

Figure 8:
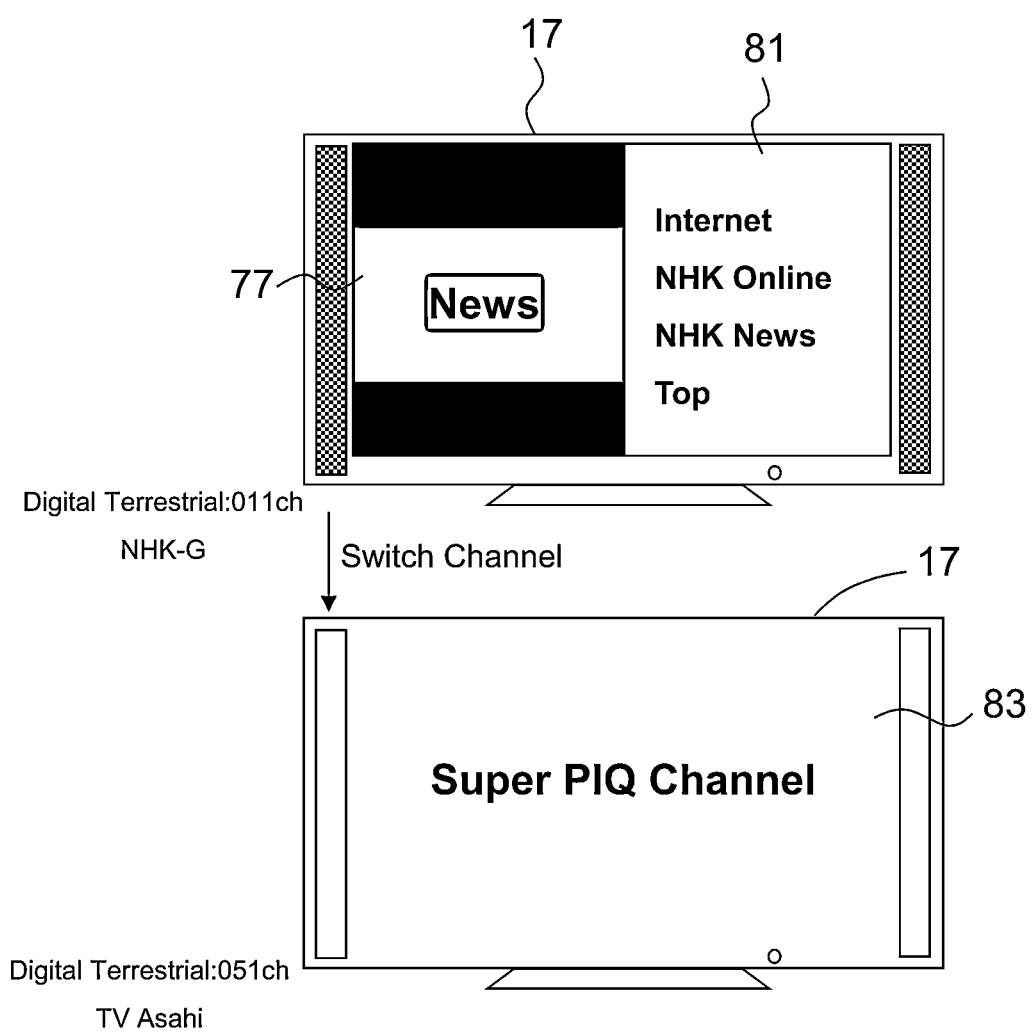
FIG. 8 is a diagram showing a fifth example of the screen switching.

FIG. 8 is a diagram showing a fifth example of the screen switching (display of the Internet) based on the aforementioned process. As shown in FIG. 8, it is often the case that a News 77 on 011 ch (NHK) of the digital terrestrial broadcasting is also posted as a news article on the HNK online site of the Internet. Thus, there may be cases where a user wishes to view a two-screen display of the TV+Internet only when watching the news. Thus, a new adjustment item is set on the adjustment item setting file 23a by the user's setting through the process shown in FIG. 3.

However, as other programs such as "Super PIQ Channel" on 051 ch (TV Asahi) of the digital terrestrial broadcasting do not need the display of the Internet, there is a request that such a program be watched with a single television screen as shown in the lower view. Conventionally, as such a program is of the same genre, once the aforementioned setting is set, the display of the TV+Internet will appear even in the case of the lower view. However, if the program is registered in advance, the user can watch the news on a single screen with the program switched to a program with a different channel ID.

Next, when the program has switched to the News 77 on 011 ch (NHK) of the digital terrestrial broadcasting, the user can watch the news with a two-screen display of TV+Internet displayed with reference to the adjustment item of the adjustment item setting file 23a with the newly set adjustment item.

Figure 9:
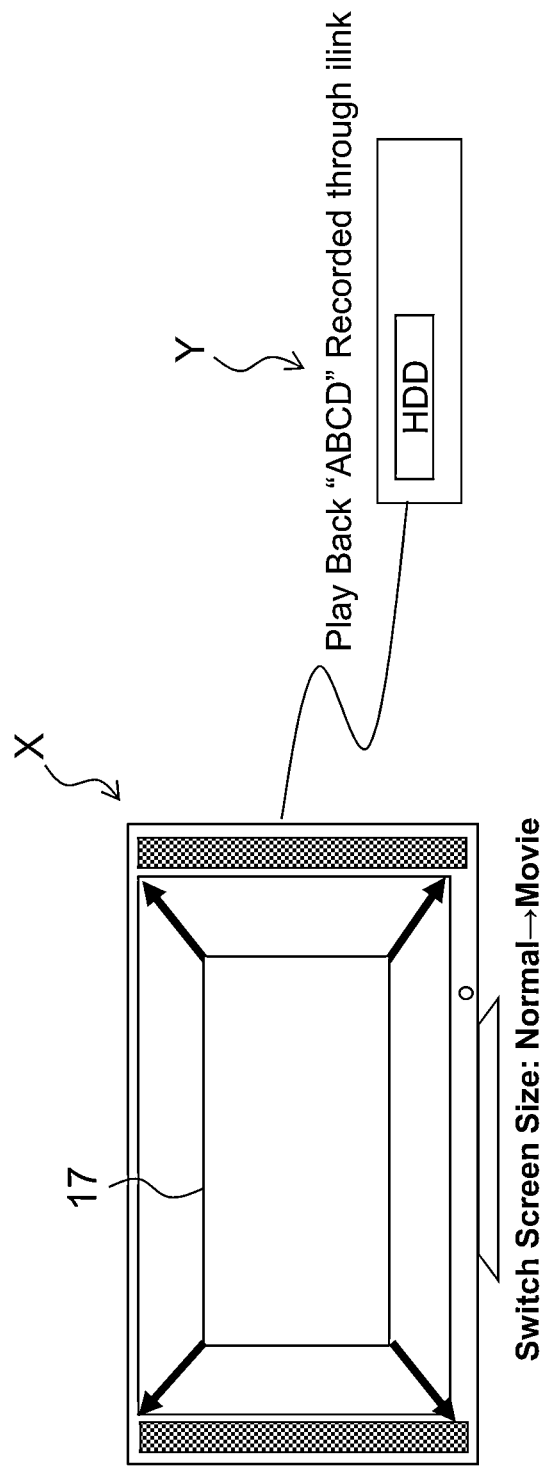
FIG. 9 is a diagram showing a sixth example of the screen switching.

FIG. 9 is a diagram showing a sixth example of the screen switching (display of the recorded content) based on the aforementioned process. When a program [ABCD] digitally recorded (TS) and stored in a HDD through iLINK or the like is played back with a recorder and watched on a screen 17 of a television X, the program information can be acquired at the time of playback. Thus, there is known an example of application in which the setting can be automatically switched on the basis of the acquired program information as with the case of the setting related to the playback switched at the time of on-time watching. That is, as long as the program name and the like are the same, it is possible to perform a process similar to the process of setting the adjustment items related to the screen switching based on FIG. 3 even on recorded programs and the like.

As described above, when a program corresponding to the program identification name stored in the adjustment item setting file 23a is watched or the like after the adjustment item setting process, there will be not need to switch the screen size to a desired size each time as the same screen size switching is executed on the basis of the adjustment item setting file. In addition, as such a process of automatically switching to the same adjustment item can be configured to be performed only when the program name is the same, for example, it is possible to prevent a program with a different program name or the like from being played back based on similar settings.

Second Embodiment

Next, a program playback device in accordance with a second embodiment of the present invention will be described with reference to a television reception device as an example. In the second embodiment, description will be made of an example in which adjustment items are stored and set on the basis of the series ID. In addition, as the adjustment items, adjustment items related to playback that is related to the displays shown in Tables 1 to 3 will be described as examples. It should be noted that as the functional block diagram has the same configuration as that in FIG. 1, the description will be made with reference to FIG. 1. In addition, the description of the adjustment items will also be made with the use of Tables 1 to 6.

It should be noted that the series ID is an ID indicating a series of programs that are broadcast in series, for example, in the same hour everyday or on a weekly basis like serial dramas. In the specifications, the series ID can be identified by a 16-bit character string (a digit sequence).

TABLE 8

Examples of the Stored Items (when series ID is used)

| Network ID | Service ID | Series ID | Screen Size Switching (SD) | Subtitle Display | Bilingual Broadcast |
|---|---|---|---|---|---|
| Standard Settings | | | | | |
| Not Set | Not Set | Not Set | Normal | OFF | Main + Sub |
| 0x0004 (BS) | Not Set | Not Set | Normal | ON | Main + Sub |
| 0x0004 (BS) | 0x065 (NHK01) | Not Set | Normal | ON | Sub |
| 0x0006 (CS) | 0x12C (300ch) | ABCD Series (0x1111) | Movie | OFF | Main + Sub |
| 0x7800 (Digital Terrestrial) | 0x00B (011ch) | X0XX0 Series (0x2222) | Normal | ON (Bottom) | Main + Sub |
| 0x8004 (Digital Terrestrial) | 0x03D (061ch) | News Series (0x3333) | Normal | OFF | Sub |
| 0x7780(IPTV) | Not Set | Not Set | Smart Zoom | ON | Main + Sub |

Table 8 is a table showing examples of the items stored in the adjustment item setting file 23a in this embodiment. In Table 8, the network ID, the service ID, the series ID, the screen size switching (standard image quality SD), subtitle display, and bilingual broadcast are given as examples of the items that can be set. Among them, for the television broadcasting, a channel is identified by the network ID and the service ID, while for an IPTV and the like, a source is identified by the network ID.

Referring to the row direction of Table 8, in the top row set as the standard settings, the network ID, the service ID, and the series ID are not set, the screen size switching (standard image quality SD) is normal, the subtitle display is OFF, and the bilingual broadcast is main language+sub-language.

Referring to the settings in the second row from the top, the network ID is 0x0004(BS), the service ID and the series ID are not set, the screen size switching (standard image quality SD) is normal, the subtitle display is ON, and the bilingual broadcast is main language+sub-language. This indicates that the settings are applied to a program of any channel or with any series ID of a BS broadcast. That is, as long as the network ID is the same, adjustment items that are set can be uniform independently of the service ID or the series ID.

Referring to the third row from the top, when the network ID is 0x0004(BS), the service ID is 0x065(NHK101), and the series ID is not set, the screen size switching (standard image quality SD) is normal, the subtitle display is ON, and the bilingual broadcast is sub-language. This indicates that the settings are applied to any program of NHK 01 of the BS broadcast. That is, as long as each of the network ID and the service ID is the same, adjustment items that are set can be uniform independently of the series ID.

Referring to the fourth row from the top, when the network ID is 0x0006(CS), the service ID is 0x12C (300ch), and the series ID is (0x1111) of a series of the programs ABCD, the screen size switching (standard image quality SD) is movie, the subtitle display is OFF, and the bilingual broadcast is main language+sub-language. This indicates that the settings are applied to a series of the programs "ABCD" whose series ID is (0x1111) on 300 ch of the CS broadcast. That is, as long as each of the network ID, the service ID, and the series ID is the same, adjustment items that are set can be uniform.

Referring to the fifth row from the top, when the network ID is 0x7800 (digital terrestrial broadcast), the service ID is 0x00B (011ch), and the series ID is (0x2222) of a series of the programs XOXXO, the screen size switching (standard image quality SD) is normal, the subtitle display is ON (bottom), and the bilingual broadcast is main language+sub-language. This indicates that the settings are applied to a series of the programs XOXXO whose series ID is (0x2222) on 011 ch of the digital terrestrial broadcast. That is, as long as each of the network ID, the service ID, and the series ID is the same, adjustment items that are set can be uniform.

Referring to the sixth row from the top, when the network ID is 0x8004 (digital terrestrial broadcast), the service ID is 0x03D (061ch), the series ID is (0x3333) of a series of programs named "News Series," the screen size switching (standard image quality SD) is normal, the subtitle display is OFF, and the bilingual broadcast is sub-language. This indicates that the settings are applied to a series of the programs "News Series" whose series ID is (0x3333) on 061 ch of the digital terrestrial broadcast. That is, as long as each of the network ID, the service ID, and the series ID is the same, adjustment items that are set can be uniform.

Referring to the seventh row from the top, in the case of the Internet content whose network ID is 0x7780 (IPTV), and whose service ID and series ID are not set, the screen size switching (standard image quality SD) is smart zoom, the subtitle display is ON, and the bilingual broadcast is main-language+sub-language. This indicates that the settings are applied to any IPTV whose network ID is 0x7780. That is, adjustment items that are set on IPTVs identified by the network ID can be uniform.

As described above, by storing the adjustment items (which are exemplarily shown herein) such as the screen size switching, subtitle display, and bilingual broadcast for a series of programs identified by the network ID, the service ID, and/or the series ID, it becomes possible to display the same program again with the same adjustment items next time.

It should be noted that the user may also set the standard settings differently. Further, it is also possible to display a setting screen such as the one shown in Table 8 on the menu screen to allow entry of settings by the user. It is also possible to provide a reset button for deleting all settings and restoring the settings to those at the time of purchase, or allow recommended adjustment items to be downloaded from a network and stored.

As described above, when serial drams should be handled in a group, it is possible to, by using the series ID (series_id) and storing the network ID, the service ID, the series ID, and the screen size switching, for example, allow the user to watch only particular serial drams that he/she wishes to watch in a different screen size.

The basic process in this embodiment is similar to that in the first embodiment shown in FIG. 2.

Figure 10:
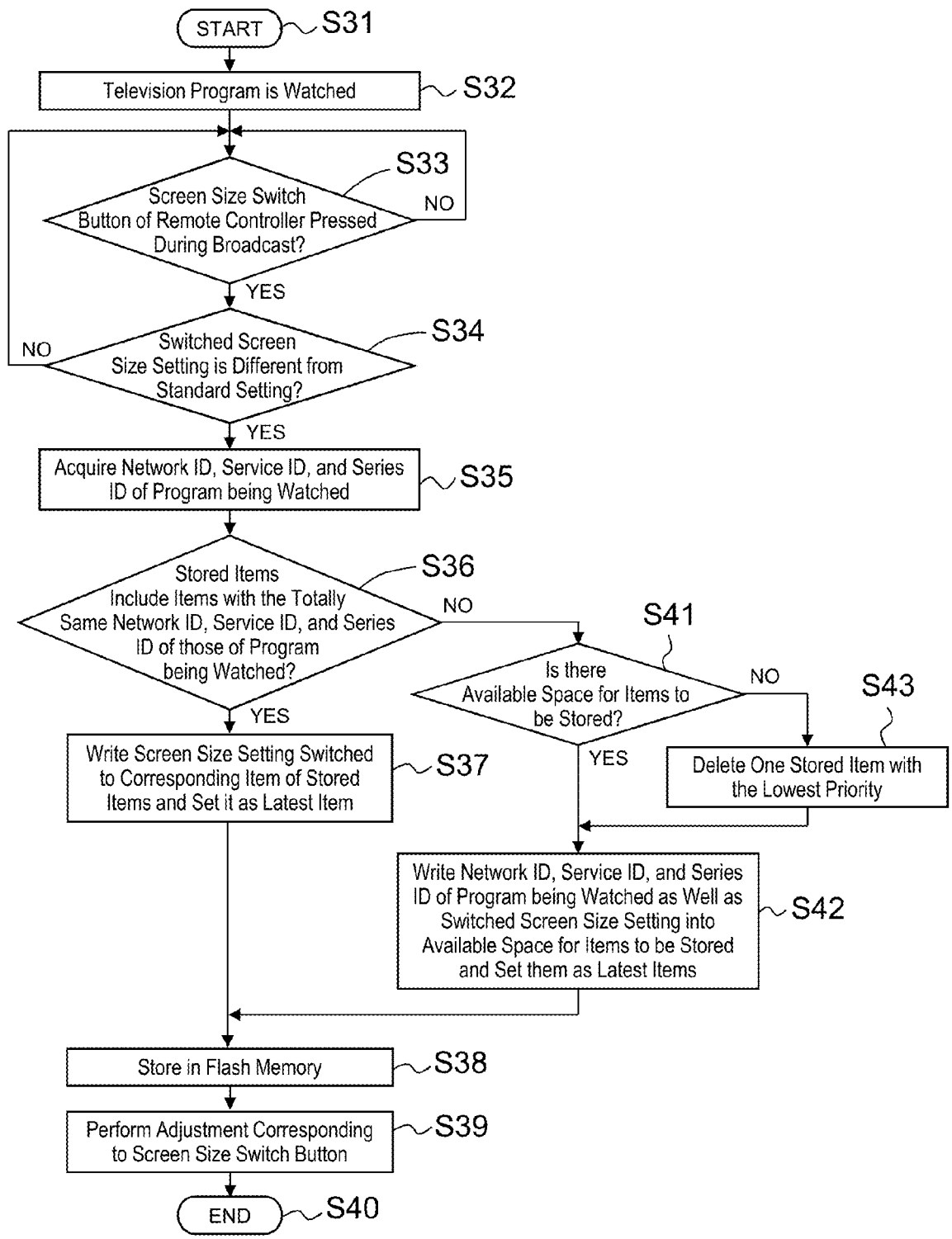
FIG. 10 is a flowchart showing a flow of a process of storing the settings in accordance with a second embodiment of the present invention, which shows an example in which an adjustment item related to the screen size switching is stored for each program name.

FIG. 10 is a flowchart showing a flow of a process of storing the settings in accordance with this embodiment, which shows an example in which an adjustment item related to the screen size switching is stored for each program name. First, in step S31, a process of the adjustment item setting unit 21a is started (START), and while a television program is watched in step S32, it is determined if the screen size switch button of the remote controller was pressed during the broadcast in step S33. If the result of step S33 is YES, the process proceeds to step S34. In step S34, it is determined if the switched screen size setting differs from that of the standard settings. If the result of step S34 is NO, the process returns to step S33. If the result of step S34 is YES, the process proceeds to step S35, and the program information acquisition unit 5 acquires from a broadcast wave and the like the network ID, the service ID, and the series ID of the program that is being watched.

Next, the process proceeds to step S36, and it is determined if the stored items of the adjustment item setting file 23a in Table 8 include items with the totally same network ID, service ID, and series ID as those of the program being watched. If the result of step S36 is YES, the process proceeds to step S37, and the current settings are overwritten with the screen size setting switched to the adjustment item corresponding to the program identification information (in this embodiment, the screen size switching). That is, such a stored item is written over and stored in the adjustment item setting file 23a in the flash memory of the memory unit 23 (step S38). In this case, as the item corresponds to an item for which the switch button was pressed in step S33, such an item is determined to be the stored item that has been set most recently (a stored item with the highest priority, namely, an item that is less likely to be deleted in step S43 described below). Next, the screen size is adjusted corresponding to the screen size switch button (step S39), and the process is terminated (step S40: END).

If the result of step S36 is NO, the adjustment item setting file 23a does not include the corresponding item. Thus, first, in step S41, it is determined if the adjustment item setting file 23a in the memory has an available space to be written. If the result of step S41 is YES, the adjustment item setting file 23a has an available space to be written with a new item to be stored. Thus, the process proceeds to step S42, and the network ID, the service ID, the series ID, and the switched screen size setting of the program being watched are written to the adjustment item setting file 23a, with the priority thereof set highest. Herein, it is assumed that the priority is given to each row of the adjustment item setting file 23a in Table 8. The newly added stored items (row) have the highest priority. Next, the process proceeds to step S38. It should be noted that the items to be stored, which include an item(s) that is/are not set (e.g., the first to third rows in Table 8), are not the targets to be deleted as in the first embodiment.

If the result of step S41 is NO, the adjustment item setting file 23a has no available space to be recorded with the items to be stored. Thus, the process proceeds to step S43, and a single stored item with the lowest priority is deleted from the adjustment item setting file 23a, and then, the process proceeds to step S42. The stored item with the lowest priority is a stored item for which the operation of acquiring information is rarely performed in step S35, and thus has the lowest priority.

As described above, according to the aforementioned process, while a given program is watched, the network ID, the service ID, and the series ID of the program are acquired, and if the three items are new items, such items can be stored in the adjustment item setting file 23a. Accordingly, when a program with the same series ID is watched next time, there is an advantage in that the screen size can be switched with reference to the corresponding adjustment item in the adjustment item setting file 23a.

Figure 11:
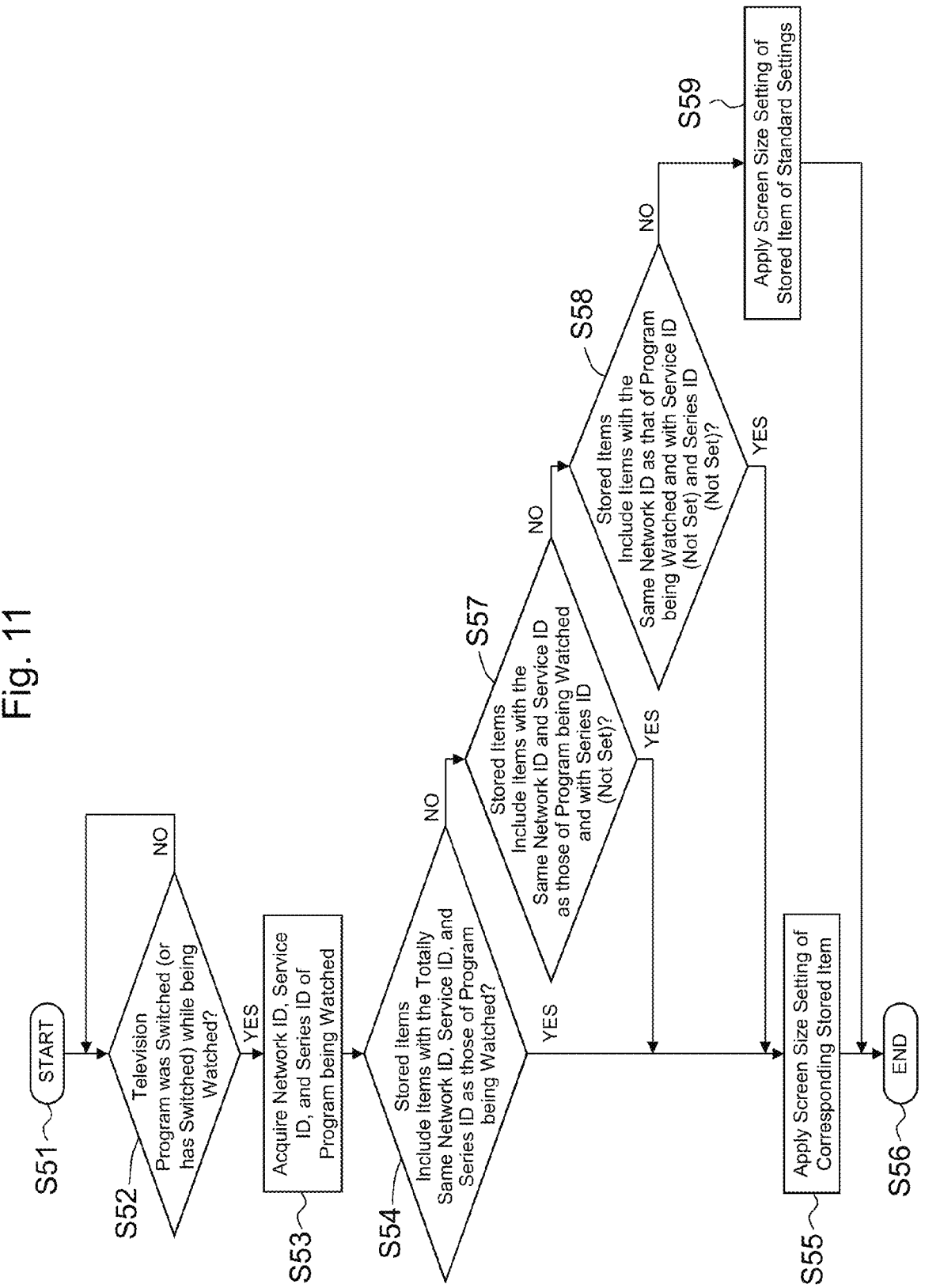
FIG. 11 is a flowchart showing a flow of a process of reflecting the settings in accordance with the second embodiment of the present invention, which is performed by the adjustment item reflecting unit.

FIG. 11 is a flowchart showing a flow of a process of reflecting the settings, which is performed by the adjustment item reflecting unit 21b. First, as shown in FIG. 11, in step S51, a process of the adjustment item reflecting unit 21b is started (START), and in step S52, while a television program is watched, if it is detected that the program is switched (or the program has switched), the program information acquisition unit 5 acquires the network ID, the service ID, and the series ID of the program that is being watched in step S53. Next, in step S54, it is determined if the stored items include items with the totally same network ID, service ID, and series ID as those of the program being watched, with reference to the adjustment item setting file 23a. If the result of step S54 is YES, the stored items already exist. Thus, the screen size setting of the corresponding stored items is set on the device in step S55, and the process is terminated (END: step S56).

If the result of step S54 is NO, the process proceeds to step S57, and it is determined if the stored items include items with the same network ID and service ID as those of the program being watched and with a series ID (not set) (e.g., items in the third row of Table 8). If the result of step S57 is YES, the process proceeds to step S55, and the screen size setting of the corresponding stored items is set on the device. If the result of S57 is NO, it is determined if the stored items include items with the same network ID as that of the program being watched and with a service ID (not set) and a series ID (not set) (e.g., items in the second row of Table 8). If the result of step S58 is YES, the process proceeds to step S55, and the screen size setting of the stored items is set on the device. If the result of step S58 is NO, the screen size setting of the stored items of the standard settings in the top row (a row with the highest priority) of Table 8 is set in step S59, and the process is terminated (step S56).

As described above, it is determined if the adjustment item setting file 23a includes adjustment items corresponding to the acquired program identification information (including a series ID), and if the adjustment item setting file 23a is determined to include such items, the program is played back with the screen size setting or the like set on the device on the basis of the adjustment items. In this case, only the program identification information includes items that are not set. Thus, even if all pieces of the program identification information do not match, as long as pieces of the program identification information excluding the items that are not set match, the program is played back on the basis of the adjustment items corresponding to the program identification information. Finally, if there is no piece of the program identification information that matches, the program is played back on the basis of the adjustment items of the standard settings.

Accordingly, it is possible to control the device to play back the program while giving priority to the adjustment items corresponding to the program. Thus, desired adjustment is can be performed.

Through the aforementioned processes, when a program with a series ID corresponding to an item stored in the adjustment item setting file 23a is watched or the like after a storing/setting process, there will be no need to switch the screen size to a desired size each time by automatically performing the same screen size switching. In addition, as such a process of automatically switching to the same adjustment item can be configured to be performed only when the series ID is the same, for example, it is possible to prevent a program with a different series ID or the like from being played back based on similar settings.

FIG. 12 is a diagram showing a first example of the screen switching based on the aforementioned process. Description will be made with reference to FIGS. 10 and 11 as appropriate. As shown in the display of the upper left end of FIG. 12, a video source of an animation program "ABCD series" on CS300 ch (nitteleplus) shown in the upper left has a ratio of 16:9. However, as the video is transmitted with an aspect ratio of 4:3 (fixed) of 480I, it is transmitted in letterbox format (a state in which the video has black bars above and below it). As a user wishes to watch the program "ABCD series" with the screen size switched to (480I: Movie), the item related to the screen switching is stored through a process such as the one shown in FIG. 8 (the screen display on the display unit 17 changes from 41 to 45, for example). At this time, a new adjustment item is set on the adjustment item setting file 23a based on the setting process shown in FIG. 10.

The next program "XYZ series" is an old animation. Thus, the video itself has a ratio of 4:3 and thus is transmitted with a letterbox cancelled. The user wishes to watch the program "XYZ series" with the screen size switched to (480I: Normal), but the screen size will be switched to (480I: Movie) according to the conventional technology as the genre of the program is an animation. However, based on FIG. 11, a new screen size is not set even if the series ID differs, and only when adjustment of the series ID has been registered, the screen size is changed accordingly.

Further, when the program is switched to the animation program "ABCD series" on CS300 ch (nitteleplus), the adjustment item setting file 23a is searched based on the adjustment item set in the aforementioned process, so that the program "ABCD series" can be watched with the screen size switched to (480I: Movie) based on the corresponding adjustment item.

FIG. 13 is a diagram showing a second example of the screen switching based on the aforementioned process.

A video source of a program "ABCD series" (animation) on CS300 ch (nitteleplus) has a ratio of 16:9. However, as the video is transmitted with an aspect ratio of 4:3 (fixed) of 480I, it is transmitted in letterbox format (a state in which the video has black bars above and below it). As a user wishes to watch the program with the screen size switched to (480I: Movie), the item related to the screen switching is stored through a process such as the one shown in FIG. 10 (the screen display on the display unit 17 changes from 41 to 45, for example).

Meanwhile, when the channel is switched to CS 333 ch (AT-X), the video is not transmitted in letterbox format as it is transmitted with an aspect ratio of 16:9 (fixed) of 480I according to AT-X though the same program "ABCD" has been broadcast. The user wishes to watch the program with the screen size switched to (480I: Normal), but according to the conventional technology, the screen size will be switched to (480I: Movie) when the series ID is the same. However, based on FIG. 11, only when adjustment of the series ID has been registered, the screen size is changed accordingly.

Further, when the program is switched to the program "ABCD series" (animation) on CS300 ch (nitteleplus), the screen size switching (480I: Movie) is applied with reference to the adjustment item setting file 23a on the basis of a process such as the one shown in FIG. 11, so that the program can be watched with the screen size switched.

As described above, when a program with a series ID corresponding to an item stored in the adjustment item setting file 23a is watched or the like after a storing/setting process, there will be not need to switch the screen size to a desired size each time by automatically performing the same screen size switching. In addition, as such a process of automatically switching to the same adjustment item can be configured to be performed only when the series ID is the same, for example, it is possible to prevent a program with a different series ID or the like from being played back based on similar settings.

It should be noted that in the aforementioned embodiments, structures and the like shown in the attached drawings are not limited thereto, and can be changed as appropriate within the range that the advantageous effects of the present invention can be exerted. Besides, such structures and the like can be changed as appropriate without departing from the scope of the object of the present invention.

For example, the playback device in accordance with this embodiment may be provided in a typical playback device, or provided in a playback device integrated with a TV. Alternatively, the playback device may be provided to a playback function of a personal computer or the like or may be provided in a recording/playback device.

It is also possible to record a program for implementing the functions described in the aforementioned embodiment on a computer-readable recording medium, and cause a computer system to read the program recorded on the recording medium so that a process of each unit is performed. It should be noted that the "computer system" herein includes an OS and hardware such as peripheral devices.

In addition, the "computer system" also includes a website providing environment (or a display environment) if the www system is used.

The "computer-readable recording medium" refers to a portable medium such as a flexible disk, a magnet-optical disk, ROM, or CD-ROM, or a storage device such as a hard disk incorporated into a computer system. Further, the "computer-readable recording medium" includes a medium that dynamically holds a program for a short period of time like a communication line when a program is transmitted via a communication line such as a network like the Internet or a telephone line, and a medium that holds a program for a given period of time like a volatile memory in a computer system servicing as a server or a client in such a case. Further, the program may be a program for implementing some of the aforementioned functions or a program that can be implemented by combining the aforementioned functions with a program that has been already recorded on a computer system.

INDUSTRIAL APPLICABILITY

The present invention can be applied to television reception devices.

REFERENCE SIGNS LIST

AT Antenna
NT Network
X Television reception device
1 Front end
3 Demultiplexer
5 Broadcast information decoding unit (Broadcast information acquisition unit)
7 Program listings data generation unit
11 Video/sound decoding unit
13 Sound output unit
15 Screen combining unit
17 Display unit (Display)
21 Control unit
21a Adjustment item setting unit
21b Adjustment item reflecting unit
23 Memory unit
23a Adjustment item setting file
27 Remote controller photo receiver
31 Interface unit
35 Server device The present disclosure contains the publications, patents, and patent applications cited in the specification, the entire content of which is hereby incorporated by reference.

The invention claimed is:

1. A playback device for playing back a program, comprising:
   a program information acquisition unit configured to acquire program identification information including a plurality of pieces of identification information for identifying a program;
   a memory unit configured to store an adjustment item setting file for setting an adjustment item related to playback of a program for each program identification information, the adjustment item setting file including a plurality of different specific items of identification information, and a setting of the adjustment item for each of the plurality of different specific items of identification information
   an adjustment item reflecting unit configured to compare the plurality of pieces of identification information of the acquired program identification information with a plurality of pieces of identification information of the program identification information stored in the adjustment item setting file, and reflect, when all of the plurality pieces of identification information match or when pieces of the identification information excluding items that are not set among the plurality of pieces of identification information match, an adjustment item corresponding to the program identification information; and
   an adjustment item setting unit configured to, when the adjustment item setting file does not include a combination of the plurality of pieces of identification information of the acquired program identification information, set the acquired program identification information and the set adjustment item in association with each other on the adjustment item setting file, wherein
   a priority is given to the program identification information of the adjustment item setting file, and
   the adjustment item setting unit is configured to, when the adjustment item is changed by a viewer while the program is watched, set the program identification information and the changed adjustment item on the adjustment item setting file by giving the highest priority thereto.

2. The playback device according to claim 1, wherein the program identification information includes a network ID or includes a channel and a program name that are identified by one of the network ID or a service ID.

3. The playback device according to claim 2, wherein the program name in the program identification information is identified by a program title.

4. The playback device according to claim 3, wherein the program is a recorded program.

5. A television reception device comprising the playback device according to claim 3.

6. The playback device according to claim 2, wherein the program name in the program identification information is identified by a series ID.

7. The playback device according to claim 6, wherein the program is a recorded program.

8. A television reception device comprising the playback device according to claim 6.

9. The playback device according to claim 2, wherein the program is a recorded program.

10. A television reception device comprising the playback device according to claim 2.

11. The playback device according to claim 1, wherein the program is a recorded program.

12. A television reception device comprising the playback device according to claim 11.

13. A television reception device comprising the playback device according to claim 1.

14. The playback device according to claim 1, wherein the adjustment item includes a screen size setting.

15. A program playback method for playing back a program, comprising:
   acquiring program identification information including a plurality of pieces of identification information for identifying a program;
   comparing the plurality of pieces of identification information of the acquired program identification information with a plurality of pieces of identification information of the program identification information stored in the adjustment item setting file, and reflecting, when all of the plurality pieces of identification information match or when pieces of the identification information excluding items that are not set among the plurality of pieces of identification information match, an adjustment item corresponding to the program identification information in playing back the program; and
   setting, when the adjustment item setting file that stores a correspondence between the program identification information and the adjustment item does not include a combination of the plurality of pieces of identification information of the acquired program identification information, the program identification information and a corresponding adjustment item on the adjustment item setting file, and
   setting, when the adjustment item is changed by a viewer while the program is watched, the program identification information and the changed adjustment item on the adjustment item setting file by giving the highest priority thereto,
   wherein the adjustment item setting file include a plurality of different specific items of identification information, and a setting of the adjustment item for each of the plurality of different specific items of identification information.

16. A non-transitory computer readable medium storing a program causing a computer to execute the program playback method according to claim 15.

* * * * *